(12) United States Patent
Chen et al.

(10) Patent No.: US 10,903,496 B2
(45) Date of Patent: Jan. 26, 2021

(54) RIGID NAPHTHALENEDIIMIDE TRIANGLE STRUCTURES

(71) Applicants: Northwestern University, Evanston, IL (US); King Abdulaziz City for Science and Technology (KACST), Riyadh (SA)

(72) Inventors: Dongyang Chen, Evanston, IL (US); Alyssa-Jennifer Avestro, Evanston, IL (US); Junling Sun, Evanston, IL (US); Zachary B. Erno, Evanston, IL (US); J. Fraser Stoddart, Evanston, IL (US)

(73) Assignees: Northwestern University, Evanston, IL (US); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 413 days.

(21) Appl. No.: 15/074,161

(22) Filed: Mar. 18, 2016

(65) Prior Publication Data

US 2016/0276669 A1    Sep. 22, 2016

Related U.S. Application Data

(60) Provisional application No. 62/135,339, filed on Mar. 19, 2015.

(51) Int. Cl.
*H01M 4/60* (2006.01)
*H01M 4/137* (2010.01)
(Continued)

(52) U.S. Cl.
CPC ............. *H01M 4/60* (2013.01); *H01M 4/137* (2013.01); *H01M 4/622* (2013.01); *H01M 4/623* (2013.01);
(Continued)

(58) Field of Classification Search
CPC ........ H01M 4/60; H01M 4/602; H01M 4/606; H01M 4/608; H01M 4/137; H01M 4/622;
(Continued)

(56) References Cited

U.S. PATENT DOCUMENTS 5,700,298 A * 12/1997 Shi .................. H01M 4/587
                                                        204/294
9,546,169 B2 * 1/2017 Stoddart .............. C07D 471/06
(Continued)

FOREIGN PATENT DOCUMENTS

WO      2014067574      5/2014
WO      2012121145      7/2014
WO    WO 2016/149611    9/2016

OTHER PUBLICATIONS

Song et al., Supporting Information for: Polymer-graphene nanocomposites as ultrafast-charge and -discharge cathodes for rechargeable lithium batteries. Nano Lett. 2012, 12, 2205-2211 and Supporting Information (Year: 2012).*

(Continued)

*Primary Examiner* — Christopher P Domone
*Assistant Examiner* — Kimberly Wyluda
(74) *Attorney, Agent, or Firm* — Quarles & Brady LLP; Tolga Gulmen

(57) ABSTRACT

Provided herein are systems and devices comprising rigid macrocyclic and nanoporous compositions of electronically coupled naphthalenediimide redox-active units and methods of preparation and use thereof, for example, in the field of energy generation and storage.

19 Claims, 19 Drawing Sheets

(51) Int. Cl.
H01M 4/66 (2006.01)
H01M 4/62 (2006.01)
H01M 4/02 (2006.01)
H01M 10/052 (2010.01)

(52) U.S. Cl.
CPC ........... *H01M 4/625* (2013.01); *H01M 4/661* (2013.01); *H01M 10/052* (2013.01); *H01M 2004/021* (2013.01); *H01M 2300/0037* (2013.01)

(58) Field of Classification Search
CPC ...... H01M 4/623; H01M 4/625; H01M 4/661; H01M 10/052; H01M 2004/021; H01M 2300/0037
See application file for complete search history.

(56) References Cited

U.S. PATENT DOCUMENTS

2004/0120100 A1 6/2004 Reynolds
2009/0186267 A1 7/2009 Tiegs
2013/0330611 A1 12/2013 Chen et al.

OTHER PUBLICATIONS

Amine et al., Rechargeable lithium batteries and beyond: Progress, challenges, and future directions. MRS Bull. 2014;39:395-401.
Armand et al., Building better batteries. Nature. Feb. 7, 2008;451(7179):652-7.
Armand et al., Conjugated dicarboxylate anodes for Li-ion batteries. Nat Mater. Feb. 2009;8(2):120-5.
Béguin et al., Supercapacitors: Materials, Systems and Applications, Wiley-VCH Press, Weinheim, Germany 2013.
Chen et al., From biomass to a renewable $Li_xC_6O_6$ organic electrode for sustainable Li-ion batteries. ChemSusChem. 2008;1(4):348-55.
Chen et al., Lithium salt of tetrahydroxybenzoquinone: toward the development of a sustainable Li-ion battery. J Am Chem Soc. Jul. 1, 2009;131(25):8984-8.
Choi et al., Challenges facing lithium batteries and electrical double-layer capacitors. Angew Chem Int Ed Engl. Oct. 1, 2012;51(40):9994-10024.
Choi et al., Radical polymer-wrapped SWNTs at a molecular level: high-rate redox mediation through a percolation network for a transparent charge-storage material. Adv Mater. Oct. 11, 2011;23(38):4440-3.
Cooper et al., Oxygen evolution on tantalum-polypyrrole-platinum anodes. Nature. Feb. 18, 1982;295:578-580.
Deblase et al., β-Ketoenamine-linked covalent organic frameworks capable of pseudocapacitive energy storage. J Am Chem Soc. Nov. 13, 2013;135(45):16821-4.
Di Pietro et al., On the use of rocking chair configurations for cyclable lithium organic electrolyte batteries. J. Power Sources 1982; 8:289-299.
Ding et al., Single-Crystalline $LiMn_2O_4$ Nanotubes Synthesized Via Template-Engaged Reaction as Cathodes for High-Power Lithium Ion Batteries. Adv. Funct. Mater. Nov. 9, 2011;21:348-355.
Foos et al., Synthesis and Characterization of Semiconductive Poly-1,4-Dimethoxybenzene and Its Derived Polyquinone. J. Electrochem. Soc. 1986;133:836-841.
Gao et al., Poly(2,5-dimercapto-1,3,4-thiadiazole) as a cathode for rechargeable lithium batteries with dramatically improved performance. Chemistry. Jul. 2, 2012;18(27):8521-6.
Geng et al., Evaluation of polyketones with N-cyclic structure as electrode material for electrochemical energy storage: case of tetraketopiperazine unit. Energy Environ. Sci. 2010; 3:1929-1933.
Goodenough et al., The Li-ion rechargeable battery: a perspective. J Am Chem Soc. Jan. 30, 2013;135(4):1167-76.
Hanyu et al., Rechargeable quasi-solid state lithium battery with organic crystalline cathode. Sci Rep. 2012;2:453.

Henderson, A Safe Portable Lamp Battery. Science. Jun. 18, 1915;41(1068):910-1.
Hernández-Burgos et al., Theoretical Studies of Carbonyl-Based Organic Molecules for Energy Storage Applications: The Heteroatom and Substituent Effect. J. Phys. Chem. C. 2014;118:6046-6051.
Huang et al., Quasi-solid-state rechargeable lithium-ion batteries with a calix[4]quinone cathode and gel polymer electrolyte. Angew Chem Int Ed Engl. Aug. 26, 2013;52(35):9162-6.
Inatomi et al., Construction of Rechargeable Batteries Using Multifused Tetrathiafulvalene Systems as Cathode Materials. ChemPlusChem. 2012;77:973-976.
Ji et al., A highly ordered nanostructured carbon-sulphur cathode for lithium-sulphur batteries. Nat Mater. Jun. 2009;8(6):500-6.
Jung et al., An improved high-performance lithium-air battery. Nat Chem. Jun. 10, 2012;4(7):579-85.
Kim et al., Effect of N-substitution in naphthalenediimides on the electrochemical performance of organic rechargeable batteries. RSC Adv. 2012;2:7968-7970.
Kou et al., Supercapacitive Energy Storage and Electric Power Supply Using an Aza-Fused π-Conjugated Microporous Framework. Angew. Chem. Int. Ed. 2011;50:8753-8757.
Liang et al., Solid-state storage batteries. J. Appl. Electrochem. 1978;8:445-454.
Liu et al., Batteries. Capturing metastable structures during high-rate cycling of $LiFePO_4$ nanoparticle electrodes. Science. Jun. 27, 2014;344(6191):1252817.
Nakahara et al., Rechargeable batteries with organic radical cathodes. Chem. Phys. Lett. 2002;359:351-354.
Nazar et al., Lithium-sulfur batteries. MRS Bull. 2014;39:436-442.
Nesvadba et al., Synthesis of a polymeric 2,5-di-t-butyl-1,4-dialkoxybenzene and its evaluation as a novel cathode material. Synth. Metals 2011;161:259-262.
Nishida et al., Organic Rechargeable Batteries with Tailored Voltage and Cycle Performance. ChemSusChem 2013;6:794-797.
Nishimura et al., Experimental visualization of lithium diffusion in $Li_xFePO_4$. Nat Mater. Sep. 2008;7(9):707-11.
Nokami et al., Polymer-bound pyrene-4,5,9,10-tetraone for fast-charge and -discharge lithium-ion batteries with high capacity. J Am Chem Soc. Dec. 5, 2012;134(48):19694-700.
Novák et al., Electrochemically Active Polymers for Rechargeable Batteries. Chem Rev. Feb. 5, 1997;97(1):207-282.
Owen, Rechargeable lithium batteries. Chem. Soc. Rev. 1997;26:259-267.
Pasquali et al., Redox mechanism and cycling behaviour of nonylbenzohexaquinone electrodes in Li cellsOriginal Research Article. Solid State Ionics. 1987;23:261-266.
Pasta et al., Full open-framework batteries for stationary energy storage. Nat Commun. 2014;5:3007.
Poizot et al., Clean energy new deal for a sustainable world: from non-$CO_2$ generating energy sources to greener electrochemical storage devices. Energy Environ. Sci. 2011;4:2003-2019.
Reddy et al., Lithium storage mechanisms in purpurin based organic lithium ion battery electrodes. Sci Rep. 2012;2:960.
Sakaushi et al., An energy storage principle using bipolar porous polymeric frameworks. Angew Chem Int Ed Engl. Jul. 27, 2012;51(31):7850-4.
Schneebeli et al., Electron sharing and anion-π recognition in molecular triangular prisms. Angew Chem Int Ed Engl. Dec. 2, 2013;52(49):13100-4.
Shakoor et al., Site-specific transition metal occupation in multicomponent pyrophosphate for improved electrochemical and thermal properties in lithium battery cathodes: a combined experimental and theoretical study. J Am Chem Soc. Jul. 18, 2012;134(28):11740-8.
Shimizu et al., Introduction of two lithiooxycarbonyl groups enhances cyclability of lithium batteries with organic cathode materials. J. Power Sources 2014;260:211-217.
Song et al., Polyimides: promising energy-storage materials. Angew Chem Int Ed Engl. Nov. 2, 2010;49(45):8444-8.
Song et al., Polymer-graphene nanocomposites as ultrafast-charge and -discharge cathodes for rechargeable lithium batteries. Nano Lett. May 9, 2012;12(5):2205-11.

(56) References Cited

OTHER PUBLICATIONS

Song et al., Towards sustainable and versatile energy storage devices: an overview of organic electrode materials. Energy Environ. Sci. 2013;6:2280-2301.
Tobishima et al., Cathode Characteristics of Organic Electron Acceptors for Lithium Batteries. J. Electrochem. Soc. 1984;131(1):57-63.
Wang et al., Developments in Nanostructured Cathode Materials for High-Performance Lithium-Ion Batteries. Adv. Mater. 2008;20:2251-2269.
Wang et al., Mesoporous LiFePO4/C Nanocomposite Cathode Materials for High Power Lithium Ion Batteries with Superior Performance. Adv. Mater. 2010, 22:4944-4948.
Whittingham, Lithium batteries and cathode materials. Chem Rev. Oct. 2004;104(10):4271-301.
International Search Report and Written Opinion for PCT/US2016/023111, dated May 27, 2016, 11 pages.

\* cited by examiner

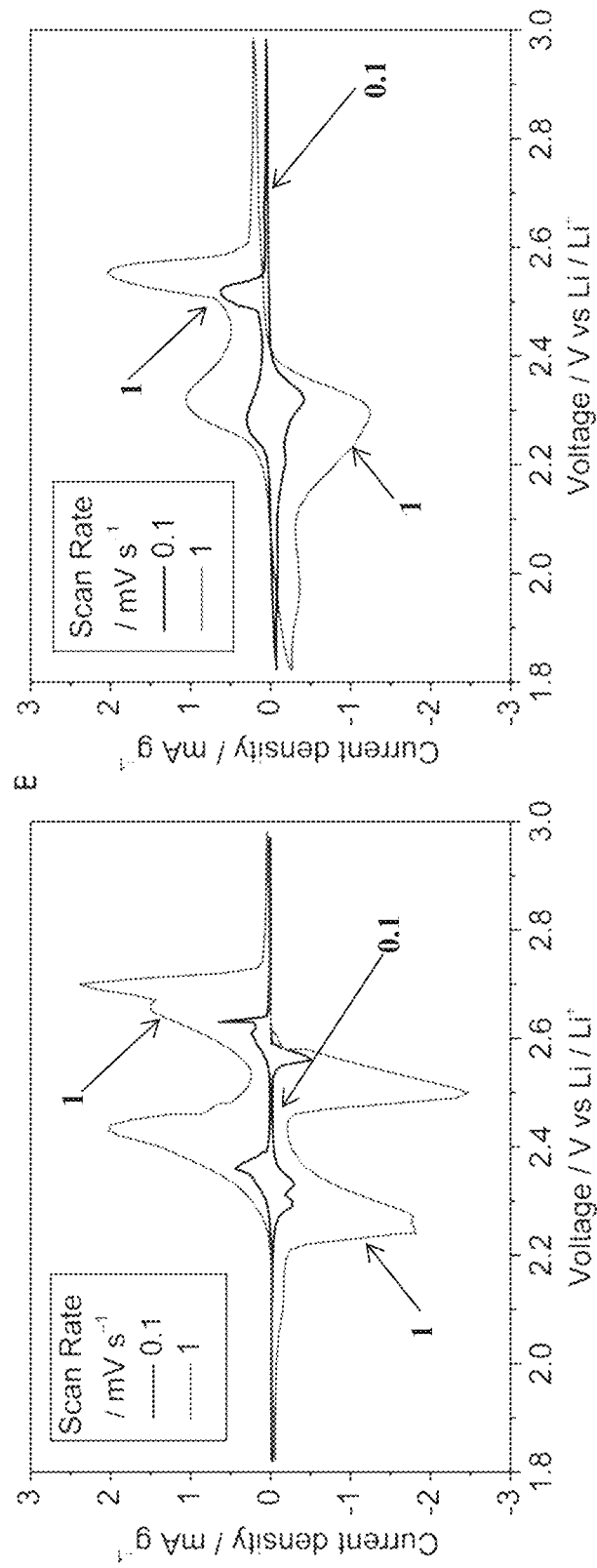

RIGID NAPHTHALENEDIIMIDE TRIANGLE STRUCTURES

CROSS REFERENCE TO RELATED APPLICATIONS

The present invention claims priority to U.S. Provisional Patent Application 62/135,339, filed Mar. 19, 2015, which is incorporated by reference in its entirety.

FIELD

Provided herein are systems and devices comprising rigid macrocyclic and nanoporous compositions of electronically coupled naphthalenediimide redox-active units and methods of preparation and use thereof, for example, in the field of energy generation and storage.

BACKGROUND

The exploration of organic electrodes as green alternative to traditional inorganic electrodes for high performance batteries is extremely challenging, because of, for example, the dissolution tendency of neutral-state organic molecules in non-aqueous electrolyte solvents and the lack of an open framework for fast ion transport in general organic electrodes.

SUMMARY

In some embodiments, provided herein are systems and devices comprising rigid macrocyclic and nanoporous compositions of electronically coupled naphthalenediimide redox-active units and methods of preparation and use thereof, for example, in the field of energy generation and storage.

In some embodiments, provided herein are cathode materials comprising: (a) a rigid, macrocyclic, nanoporous, electronically-coupled naphthalenediimide redox-active compound; (b) a binder material; (c) an electron-conducting additive. In some embodiments, the cathode material further comprises a solvent. In some embodiments, the rigid, macrocyclic, nanoporous, electronically-coupled naphthalenediimide redox-active compound comprises a compound of:

(i)

Formula (I)

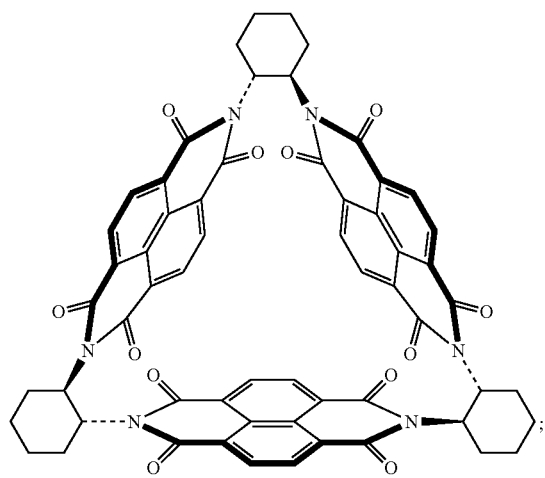

(ii)

Formula (II)

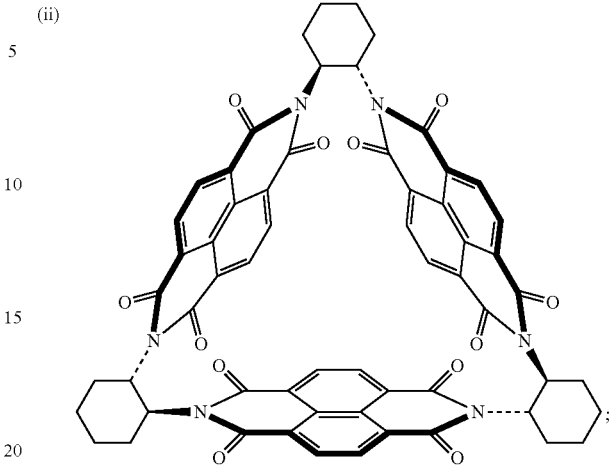

and/or (iii) a lithiated derivative of Formula (I) and/or Formula (II). In some embodiments, the rigid, macrocyclic, nanoporous, electronically-coupled naphthalenediimide redox-active compound is 1-90 wt % (e.g., 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or any ranges therebetween) of the cathode material. In some embodiments, the rigid, macrocyclic, nanoporous, electronically-coupled naphthalenediimide redox-active compound is 5-85 wt %, 10-80 wt %, 20-80 wt %, 40-70 wt %, etc. of the cathode material.

In some embodiments, the the rigid, macrocyclic, nanoporous, electronically-coupled naphthalenediimide redox-active compound is lithiated. In some embodiments, the cathode material is lithiated.

In some embodiments, the binder material comprises a polymer selected from the group consisting of: styrene-butadiene rubber (SBR); polyvinylidene fluoride (PVDF); polytetrafluoroethylene (PTFE); copolymer of tetrafluoroethylene, hexafluoropropylene, and vinylidene fluoride; copolymer of hexafluoropropylene and vinylidene fluoride; copolymer of tetrafluoroethylene and perfluorinated vinyl ether; methyl cellulose; carboxymethyl cellulose; hydroxymethyl cellulose; hydroxyethyl cellulose; hydroxypropylcellulose; carboxymethylhydroxyethyl cellulose; nitrocellulose; colloidal silica; and combinations thereof. In some embodiments, binder material comprises PVDF. In some embodiments, the binder material is 1-25 wt % (e.g., 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 20 wt %, 25 wt %, or any ranges therebetween) of the cathode material. In some embodiments, the binder material is 5-15 wt % of the cathode material.

In some embodiments, the solvent comprises N-methylpyrrolidone (NMP).

In some embodiments, the electron-conducting additive is a carbon or graphitic material. In some embodiments, the carbon or graphitic material is selected from the list consisting of: a graphite, a carbon black, a graphene, and a carbon nanotube. In some embodiments, the carbon or graphitic material is a graphite selected from the group consisting of: graphite worms, exfoliated graphite flakes, and expanded graphite. In some embodiments, the carbon or graphitic material is chemically-etched or expanded soft carbon, chemically-etched or expanded hard carbon, or exfoliated activated carbon. In some embodiments, the carbon or graphitic material is a carbon black selected from the group consisting of: acetylene black, channel black, furnace black, lamp black thermal black, chemically-etched or expanded carbon black, and combinations thereof. In some embodiments, the carbon or graphitic material is a carbon nanotube selected from the group consisting of: chemically-etched multi-walled carbon nanotube, nitrogen-doped carbonnanotube, boron-doped carbon nanotube, chemically-doped carbonnanotube, ion-implanted carbon nanotube, and combinations thereof. In some embodiments, the electron-conducting additive comprises carbon black. In some embodiments, the electron-conducting additive is 1-99 wt % (e.g., 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 96 wt %, 97 wt %, 98 wt %, 99 wt %, or any ranges therebetween) of the cathode material. In some embodiments, the electron-conducting additive is 5-85 wt % of the cathode material.

In some embodiments, the cathode material is present as a slurry. In some embodiments, the slurry comprises a solid content of 40-80% 40 wt %, 45 wt %, 50 wt %, 55 wt %, 60 wt %, 65 wt %, 70 wt %, 75 wt %, 80 wt %, or any ranges therebetween).

In some embodiments, the cathode material is dried (e.g., solvent evaporated out of a slurry). In some embodiments, the cathode material is dried under increased heat (e.g., above room temperature (e.g., 40° C., 50° C., 60° C., 70° C., 80° C., 90° C., 100° C., 110° C., 120° C., 130° C., 140° C., 150° C.,), reduced pressure (e.g., below atmospheric pressure, under vacuum), etc.

In some embodiments, provided herein are cathodes comprising a cathode material described herein. In some embodiments, a cathode further comprises a foil substrate. In some embodiments, the foil substrate is an aluminum foil substrate. In some embodiments, a slurry comprising the cathode material is coated onto the foil substrate and dried.

In some embodiments, provided herein are batteries comprising a cathode described herein.

In some embodiments, a battery further comprises an anode.

In some embodiments, an anode comprises: (a) a graphite or other carbon-based active material; (b) a binder material; (c) an electron-conducting additive; and (e) a copper or nickel foil substrate. In some embodiments, an anode further comprises a solvent. In some embodiments, the binder material, electron-conducting additive, and/or solvent of the anode are selected from the binder materials, electron-conducting additives, and/or solvents described herein for use in cathodes. In some embodiments, the anode comprises a lithium active material rather than a graphite or other carbon-based active material. In some embodiments, the graphite or other carbon-based active material of the anode is lithiated.

In some embodiments, a battery further comprises a separator. In some embodiments, the separator comprises polypropylene (PP), polyethylene (PE), or a combination of layers thereof.

In some embodiments, a battery further comprises an electrolyte material. In some embodiments, the electrolyte material comprises NiCd, NiMH, Li-ion, Li-ion polymer, lead acid, and/or alkaline. In some embodiments, the electrolyte material comprises Lithium ions. In some embodiments, the electrolyte material comprises non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and/or lithium triflate ($LiCF_3SO_3$). In some embodiments, the electrolyte material further comprises a mixture of organic carbonates. In some embodiments, the mixture of organic carbonates comprises ethylene carbonate and/or diethyl carbonate.

In some embodiments, a battery described herein is rechargeable.

In some embodiments, provided herein are methods of storing energy within a batter described herein.

In some embodiments, provided herein are methods of preparing a cathode material comprising a rigid, macrocyclic, nanoporous, electronically-coupled naphthalenediimide redox-active compound described herein; methods of preparing a cathode comprising said cathode material; methods of preparing a battery comprising said cathode; and methods of preparing a device comprising said battery.

In some embodiments, provided herein are systems, compositions, and devices comprising organic capacitors, super capacitors, organic dopants, redox-active charge carriers, photovoltaics, solar cells, organic thin-film semiconductors, etc. comprising the rigid, macrocyclic, nanoporous, electronically-coupled naphthalenediimide redox-active compound described herein.

BRIEF DESCRIPTION OF THE DRAWING

FIG. 6A-D: Cyclic voltammograms (CVs) and charge/discharge properties of the (−)-NDI-Δ and NDI-Ref batteries. CVs recorded at 0.1 and 1 mV·s−1 scan rates for A) the (−)-NDI-Δ battery and B) the NDI-Ref battery. Charge/discharge curves at different current rates for C) the (−)-NDI-Δ battery and D) the NDI-Ref battery.

DEFINITIONS

Figure 1:
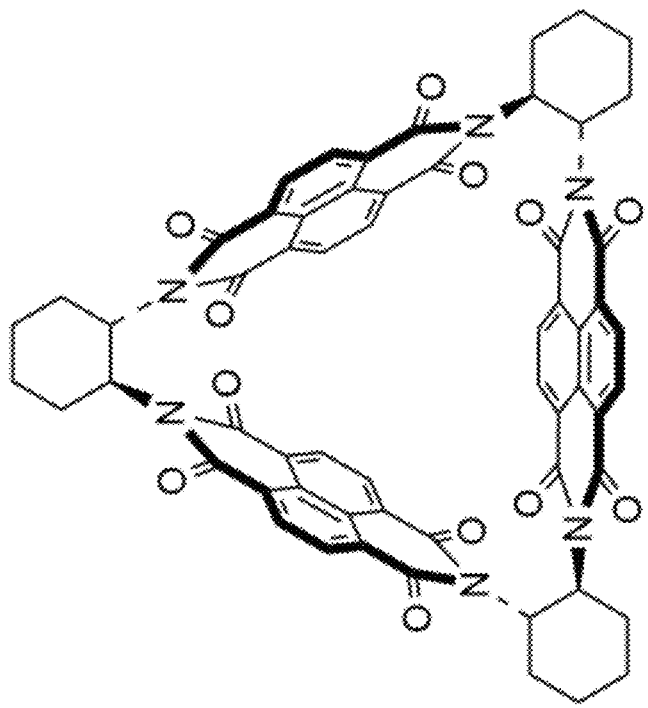
FIG. 1: Chemical structures of (−)-NDI-Δ (left) and (+)-NDI-Δ (right).
Figure 1:
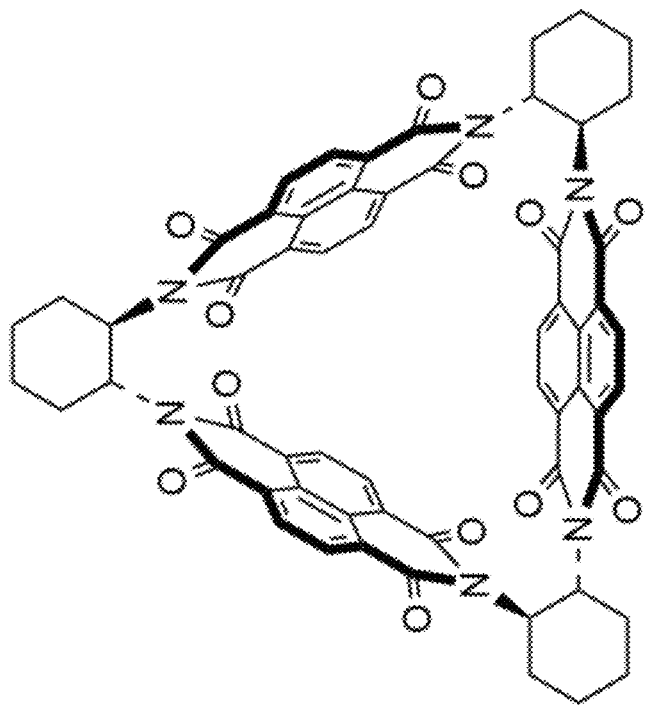

As used herein, the term "battery" refers to a device or system, as least comprising an anode, a cathode, and an ion-conducting electrolyte interposed therebetween.

As used herein, an "anode" is an electrode through which (positive) electric current flows into a polarized electrical device. In a battery, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase.

As used herein, a "cathode" is an electrode from which (positive) electric current flows out of a polarized electrical device. In a battery, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase.

DETAILED DESCRIPTION

Provided herein are systems and devices comprising rigid macrocyclic and nanoporous compositions of electronically coupled naphthalenediimide redox-active units and methods of preparation and use thereof, for example, in the field of energy generation and storage.

Organic electrodes were employed containing nanoporous redox-active molecules, namely (−)-NDI-Δ and (+)-NDI-Δ, which were composed of three naphthalenediimide functionalities surrounding a rigid triangular cavity. More than half of their theoretical capacity was accessed at a current rate of 60 C (9.3 A·g−1), remarkably higher than all the other naphthalenediimide derivatives and most of the organic species reported to date. In addition, a capacity of 71.1 mAh g$^{-1}$ was maintained after 300 cycles at 10 C. These organic electrodes are usable in many battery systems such as lithium batteries, sodium batteries and whole organic batteries.

Batteries, one of the most efficient and convenient energy storage technologies, have powered a revolution in daily lives for over a century. The exploration of new battery chemistries and the optimization of existing ones—to improve properties in terms of energy and power densities, lifetime, safety, and cost—have been of long-standing interest and an ongoing pursuit for researchers worldwide in order to satisfy the accelerating technological growth and global demand for lighter, faster and more sophisticated electronic devices (refs. 1-8; incorporated by reference in their entireties). Lithium-ion batteries represent one of the most successful examples in the historic search for high energy and power density batteries, and have dominated the mobile electronic device market ever since they were invented (refs. 9-12; incorporated by reference in their entireties). Many believe, however, that traditional lithium-ion batteries based on transition metal oxide cathodes and graphite anodes are approaching their performance limits (ref. 13; incorporated by reference in its entirety). In order to sustain the development of contemporary technologies and their associated economies, new breakthroughs in the design and synthesis of next-generation battery materials with (i) high atom economy, (ii) tunable properties, and (iii) low environmental impact are essential (refs. 12,14; incorporated by reference in their entireties). Organic rechargeable lithium-ion batteries avoid the use of heavy metals by employing redox-active organic molecules to store and release charges on demand, holding the promise of renewable and sustainable development (refs. 15-18; incorporated by reference in their entireties). Both organic small molecules and polymers with various redox characteristics have been investigated in electrodes during the past two decades, attesting to their conceptual validity as active materials for lithium-ion batteries (refs. 19-21; incorporated by reference in their entireties). Despite the ease of their synthesis and the ability to tune their electronic properties, the neutral states of organic small molecules are often quite soluble in common battery electrolyte solvents, such as carbonates and ethers, resulting in fast capacity decay during cycling tests (refs. 22-28; incorporated by reference in their entireties). Polymerization of redox-active units minimizes their solubility, but usually requires the use of large amounts of electron-conducting additive (e.g., carbon black, graphene, or carbon nanotubes) to provide a continuous electronic pathway between the redox-active sites and the electrodes (refs. 29-31; incorporated by reference in their entireties). Most importantly, the measured rate capabilities of organic electrodes tend to be much lower than those of traditional inorganic ones, perhaps because they lack a rigid three-dimensional nanoporous framework—a feature inherent to crystalline inorganic materials—to aid and abet the efficient diffusion of Li+ ions throughout the active layer to sustain the effectiveness of electrochemical reactions in the battery (refs. 32-34; incorporated by reference in their entireties).

Embodiments described herein have numerous advantages over existing technologies, including:

The triangular arrangement of redox active NDI units represents a unique geometrical feature not available with other geometries, which favors electron sharing while at the same time providing a rigid, shape-persistent framework to enable potentially fast and efficient charge diffusion pathways in an electrochemical device;

Increased rate capability of organic electrodes;

Lowered solubility of redox-active units in non-aqueous electrolytes;

Inexpensive and green route to produce high performance organic electrodes;

Enhanced stability of redox intermediates for reversible reactions; and

Capability of coupling with any other electrodes (e.g., in batteries).

The following is a description of the synthesis of exemplary rigid naphthalenediimide triangular compounds, production of exemplary organic rechargeable lithium-ion batteries comprising such compounds, and the results of experiments testing the aforementioned exemplary compounds and batteries. Greater detail is provided in the Experimental section further below.

Naphthalenediimide triangular compounds (−)-NDI-Δ and (+)-NDI-Δ (FIG. 1) were synthesized and scaled using the protocol outlined in Angew. Chem. Int. Ed. 2013, 52, 13100-13104.; herein incorporated by reference in its entirety.

(−)-NDI-Δ: A warm solution of (RR)-trans-1,2-cyclohexanediamine (1.71 g, 15.0 mmol) in anhydrous DMF (10 ml) was added quickly to a solution of naphthalenetetracarboxylic dianhydride (3.98 g, 14.8 mmol) in anhydrous DMF (200 ml) with vigorous stirring at 150° C. The resulting dark red reaction mixture was stirred at 150° C. for 5 h and the DMF was evaporated under reduced pressure at 75° C. The residue was purified by flash column chromatography over silica gel ($CH_2Cl_2$/$Me_2CO$, 0-10% $Me_2CO$), followed by precipitation of the product with MeOH to afford pure (−)-NDI-Δ product.

(+)-NDI-Δ: A warm solution of (SS)-trans-1,2-cyclohexanediamine (1.71 g, 15.0 mmol) in anhydrous DMF (10 ml) was added quickly to a solution of naphthalenetetracarboxylic dianhydride (3.98 g, 14.8 mmol) in anhydrous DMF (200 ml) with vigorous stirring at 150° C. The resulting dark red reaction mixture was stirred at 150° C. for 5 h and the DMF was evaporated under reduced pressure at 75° C. The residue was purified by flash column chromatography over silica gel ($CH_2Cl_2$/$Me_2CO$, 0-10% $Me_2CO$), followed by precipitation of the product with MeOH to afford pure (+)-NDI-Δ product.

Active material (either (−)-NDI-Δ or (+)-NDI-Δ), carbon black, and polyvinylidene fluoride (PVDF) binder were mixed in hot N-methyl-2-pyrrolidone (NMP) to form a well-dispersed slurry, which was subjected to ultrasonication for 1 h and then coated onto an aluminum foil substrate. Coatings were dried immediately in a blast oven at 80° C. for 1 h, followed by complete drying in a vacuum oven at 120° C. for 24 h to produce electrodes that were cut into desired shapes. The weight ratio of PVDF in the electrode is between 5-15%. The weight ratio of active material in the electrode is between 10-80%. The rest component in the electrode is carbon black.

Figure 2:
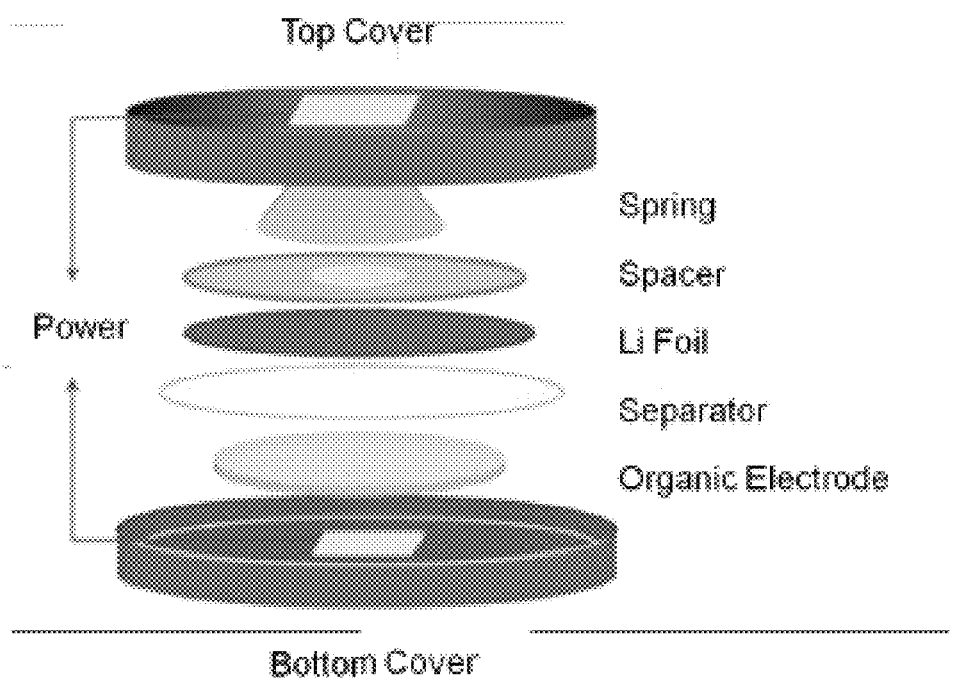
FIG. 2: Schematic representation of the battery structure.

Electrodes were transferred into a glove box (water content: 0.35 ppm; oxygen content: 5 ppm) and assembled under an Ar atmosphere into lithium batteries using CR2025 coin cell hardware, with a lithium foil counter electrode and a Celgard® 2400 separator that was treated on each side with an electrolyte solution containing 1 M lithium bis (trifluoromethane-sulfonyl)imide (LiTFSI) and 0.2 M lithium nitrate in a mixed solvent system (1:1 v/v) of 1,3-dioxolane and 1,2-dimethoxyethane. The battery structure is depicted in FIG. 2.

Figure 3:
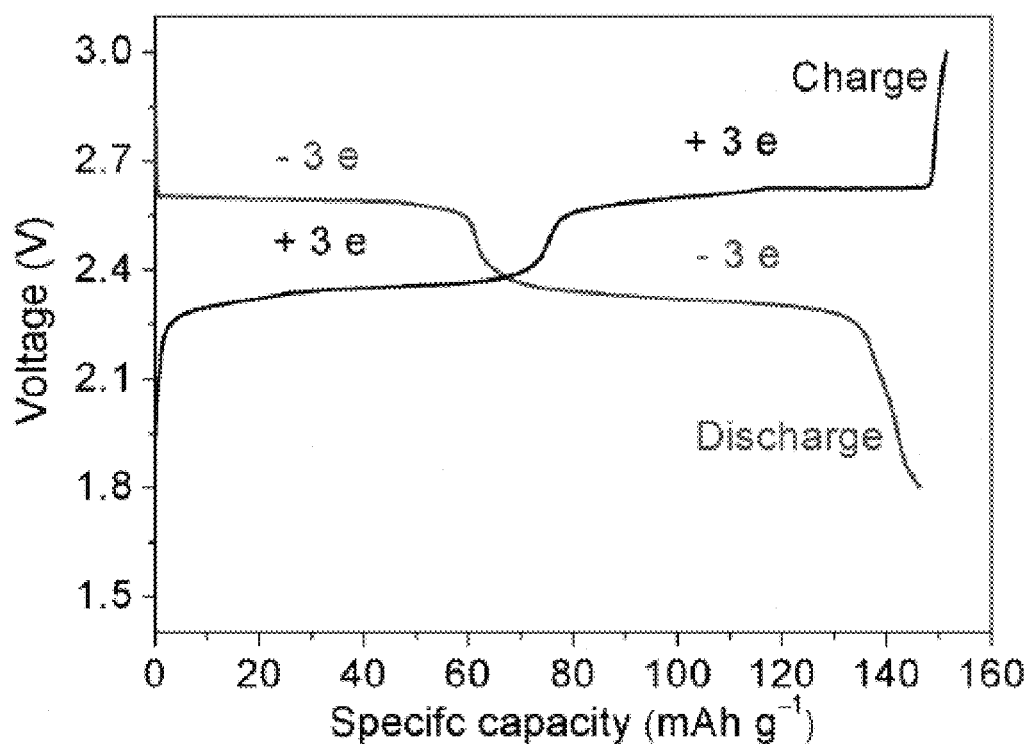
FIG. 3: Charge/discharge properties of a battery assembled with (−)-NDI-Δ electrode (50% of (−)-NDI-Δ, 40% of carbon black, and 10% of PVDF) at a current density of 0.0155 mAh g$^{-1}$ (0.1 C).

The batteries are subjected to galvanostatic charging/discharging. At a current density of 0.0155 mAh $g^{-1}$ (0.1 C), a charge capacity of 151.3 mAh $g^{-1}$ and a discharge capacity of 146.4 mAh $g^{-1}$ are achieved (FIG. 3), approaching the theoretical capacity of (−)-NDI-Δ (154.8 mAh $g^{-1}$). Two charge plateaus (around +2.35 and +2.62 V) and two discharge plateaus (around +2.32 and +2.59 V) are found.

Figure 4:
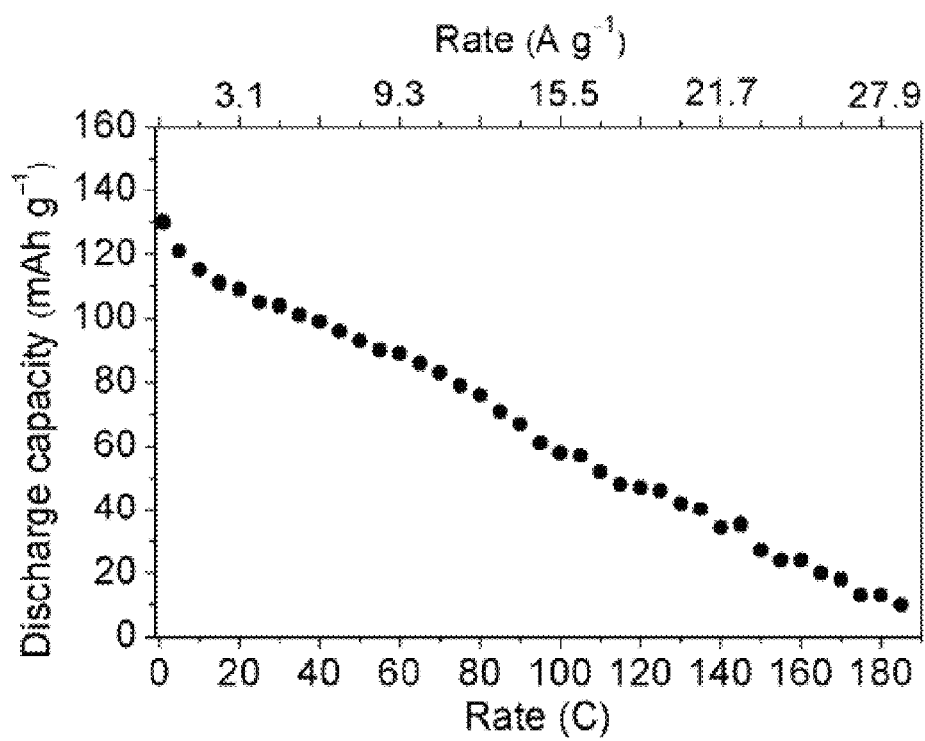
FIG. 4: Charge/discharge properties of a battery assembled with (−)-NDI-Δ electrode (50% of (−)-NDI-Δ, 40% of carbon black, and 10% of PVDF) at various current rates.

Increasing the charge/discharge current rate results in slow decrease of discharge capacity. The battery is operated at exceptionally high current rates of up to 185 C while still maintaining a capacity of about 10 mAh $g^{-1}$. The battery's discharge capacity at current rates of 65 C and 100 C are 86 and 58 mAh $g^{-1}$, respectively. The experimental charge/discharge time at these two current rates are 30 and 11 s, respectively. Such fast charge/discharge rate is important for next-generation batteries, not only for electric vehicles but also for mobile devices and other applications where fast charge/discharge speed is highly desirable (See FIG. 4).

Experiments conducted during development of embodiments of the present invention have demonstrated ultrahigh rate capability for the nanoporous molecular triangles (−)-NDI-Δ and (+)-NDI-Δ in organic rechargeable lithium-ion batteries, which possess an ideal balance of electronic and molecular structural properties in the solid-state for supporting electrode reactions in an efficient manner. A capacity of 146.4 mAh $g^{-1}$ at a low current rate of 0.1 C and a capacity of 58.1 mAh $g^{-1}$ at an ultrahigh rate of 100 C were achieved. Furthermore, the battery is rechargeable, maintaining a capacity of 71.1 mAh $g^{-1}$ after cycling at 10 C for 300 cycles. The ultrahigh rate performance displayed by the (−)-NDI-Δ and (+)-NDI-Δ batteries are a fundamental development of a strategy involving small-molecules for improving the properties of organic active materials. This advance results from (i) organizing a number of electronically coupled redox-active units in a rigid, shape-persistent manner to stablize eletrochemical reactions, while at the same time (ii) introducing an intrinsic nanoporosity that may allow for effective $Li^+$ ion diffusion and (iii) imparting a limited solubility of the active material to maintain overall electrode stability; although the present invention is not limited to any particular mechanism of action and an understanding of the mechanism of action is not necessary to practice the present invention.

EXPERIMENTAL

Example 1

Materials and Methods

Starting materials were purchased from commercial sources and used as received to synthesize the active materials, namely (−)/(+)-NDI-Δ and NDI-Ref. The molecular triangles were obtained from a single-step condensation of the appropriate dianhydride with either (RR)- or (SS)-trans-1,2-diaminocyclohexane, followed by column chromatography (SiO$_2$: 2% Me$_2$CO in CH$_2$Cl$_2$) and recrystallization (MeOH/CH$_2$Cl$_2$). The control compound (NDI-Ref) was prepared in a similar manner from naphthalene dianhydride and cyclohexylamine. BET surface area of the active materials was measured by nitrogen adsorption and desorption isotherms in the range 0.01-0.98 P/P$_0$ using a Micromeritics ASAP 2010 volumetric adsorption analyser.

Organic electrodes were fabricated using the following procedure. The active material, carbon black (Timcal Super P®), and polyvinylidene fluoride (PVDF) binder (300 mg in total) were mixed in a ratio of 5:4:1 (50 wt % active material) or 7:2:1 (70 wt % active material) by weight in 4 mL of hot N-methyl-2-pyrrolidone (NMP) to form a well-dispersed slurry, which was subjected to ultrasonication for 1 h and then coated onto an aluminum foil substrate. Coatings were dried immediately in a blast oven at 80° C. for 1 h, followed by activation in a vacuum oven at 120° C. for 24 h to produce membranes that were cut into circular electrode discs with a diameter of 14 mm. After weighing the electrode discs (active material loading: ca. 2 mg cm$^{-1}$), they were transferred into a glove box (H$_2$O content: 0.35 ppm; O$_2$ content: 5 ppm) and assembled under an Ar atmosphere into half lithium-ion batteries using CR2025 coin cell hardware, with lithium foil as the counter electrode and a Celgard® 2400 separator that was treated on each side with an electrolyte solution (50 µL times two) containing 1 M lithium bis(trifluoromethane-sulfonyl)imide (LiTFSI) and 0.2 M lithium nitrate in a mixed solvent system (1:1 v/v) of 1,3-dioxolane and 1,2-dimethoxyethane.

Galvanostatic charging/discharging of the batteries was monitored within a voltage window of 1.8-3.0 V (versus Li/Li$^+$) using (i) a Neware Battery Tester for applied currents lower than 10 mA, and (ii) a Solartron 1287 Electrochemical Interface for applied currents higher than 10 mA. Batteries were first activated by discharging, followed by cycling tests at the same rate. For high-rate testing, an activation current rate of 1 C was applied. Cyclic voltammograms (CVs) were recorded within the same voltage window on a Solartron 1287 Electrochemical Interface at scan rates of 0.1 and 1 mV·s$^{-1}$. Electrochemical impedance spectra were recorded on a Solartron 1255B frequency response analyser, coupled with a Solartron 1287 electrochemical interface. The frequency was scanned from 100 MHz to 0.1 Hz and the amplitude of the stimulus potential was set to 5 mV. The rate performances of the batteries were tested by charging/discharging the batteries at different increasing current rates, starting from 1 C. Electrochemical testing was conducted at either room temperature (~25° C.) or 55° C. in the case of the temperature-dependent investigations.

Thermal Gravimetric Analysis

Figure 9:
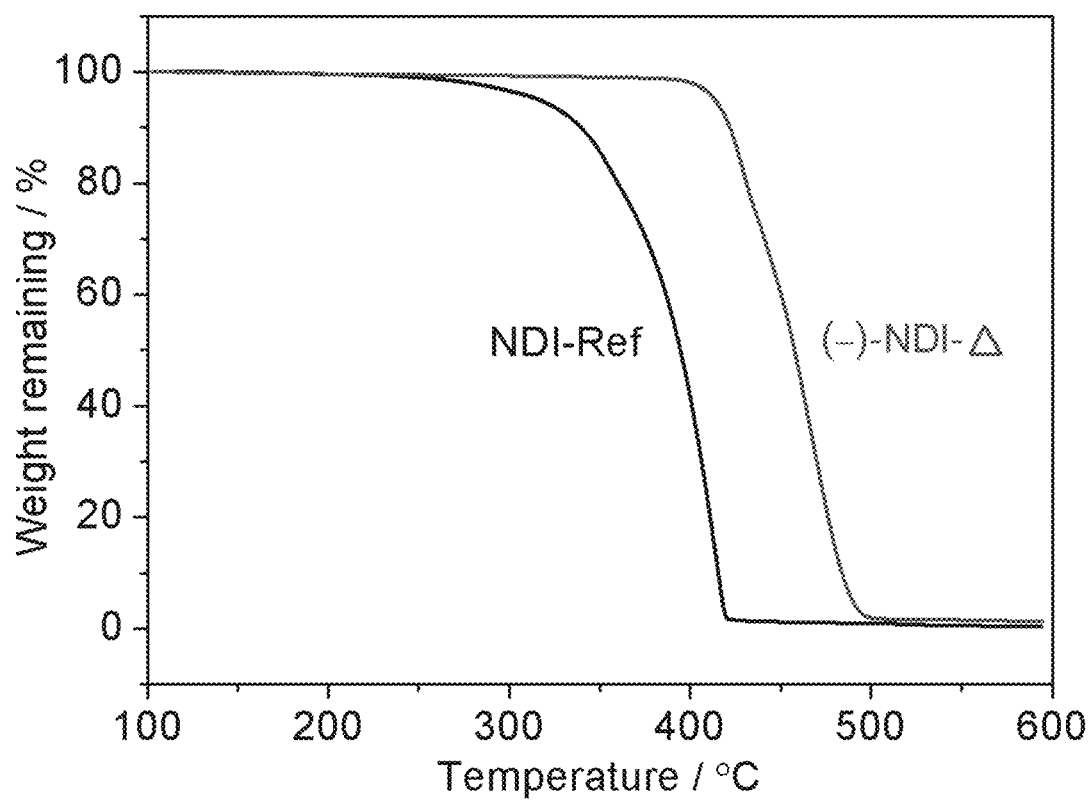
FIG. 9: Thermogravimetric analysis curves of (−)-NDI-Δ and NDI-Ref.

Thermal stabilities were analyzed using a PerkinElmer Pyris Diamond TG/DTA analyzer. The temperature was increased from room temperature to 600° C. at a heating rate of 10° C. min$^{-1}$ under N$_2$ atmosphere. Both (−)-NDI-Δ and NDI-Ref exhibit (FIG. 9) one-step decomposition profiles where (−)-NDI-Δ is thermally stable up to 400° C., while NDI-Ref starts to decompose at 250° C. The greater thermal stability of (−)-NDI-Δ is attributed to its higher molecular weight and more rigid structure compared to NDI-Ref.

Scanning Electron Microscopy (SEM)

Figure 10:
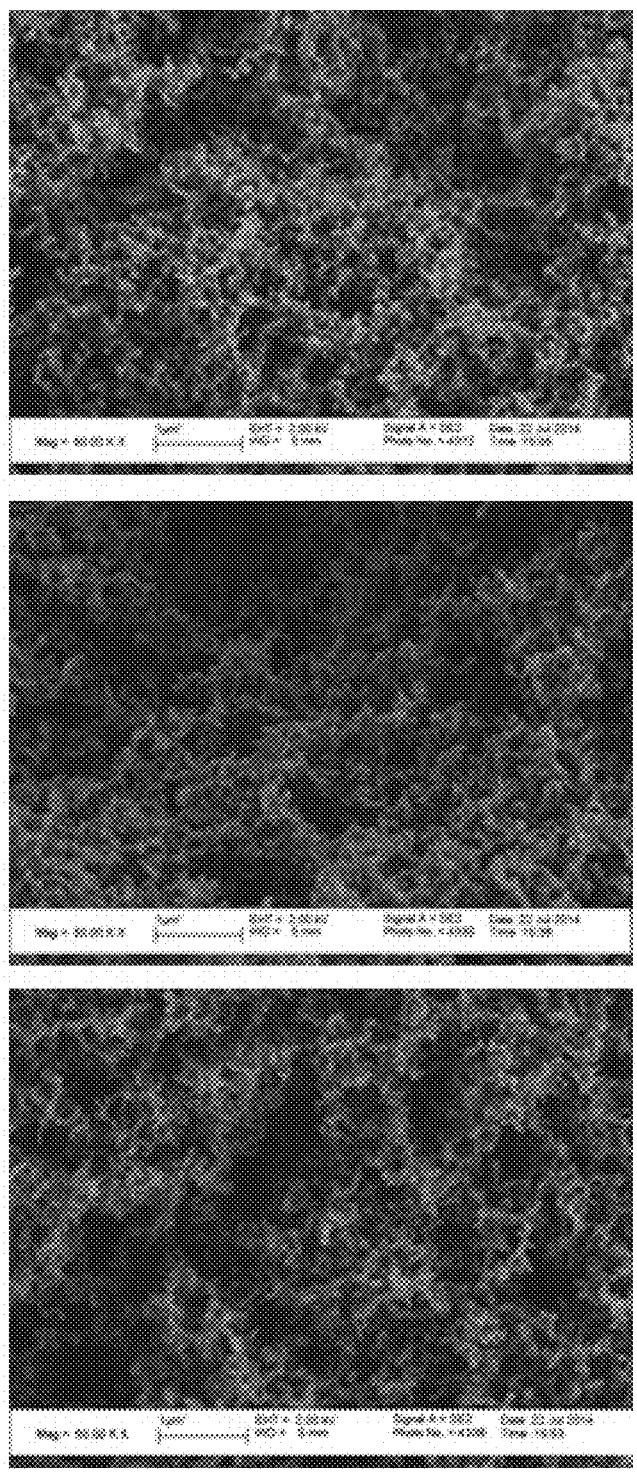
FIG. 10: Scanning electron microscope (SEM) images. By SEM, organic electrodes composed of 10 wt % PVDF binder and 50 wt % (−)-NDI-Δ (top) or NDI-Ref (middle) as the active materials appear identical to a control electrode (bottom) containing only 10 wt % of PVDF and 90 wt % of carbon black.

SEM Images were taken using LEO Gemini 1525 FEG SEM with an accelerating voltage of 2 kV. The characteristic particle of carbon black appears (FIG. 10) to be the only feature discernible in the SEMs of the organic electrodes, despite the fact that the PVDF binder and the (−)-NDI-Δ (top) or NDI-Ref (middle) active materials are present in 10 and 50 wt %, respectively. The SEM images of both electrodes appear identical to a membrane containing only 10 wt % PVDF binder (bottom). Consistent with previous reports, it is not possible to distinguish the low concentration of PVDF binder presumably because it coats carbon black and the active materials in a uniformly thin layer. Likewise, these observations imply that, despite their relatively high 50 wt % loading contents in the membrane, the active materials may have also formed a uniformly thin layer of indiscernible thickness, in addition to being adsorbed into the interstices of carbon black. Altogether, these images reveal satisfying and complete dispersion of the active materials within the organic electrode membrane.

Composition Optimization

Half lithium-ion batteries comprised of 50 and 70 wt % content loadings of (−)-NDI-Δ as the active material (10 wt % PVDF binder) were prepared and evaluated for cell performance at a conventional current rate of 0.1 C. At an active material loading of 70 wt %, the battery delivers (FIG. 11) a moderate discharge capacity of 120.7 mAh g$^{-1}$, while 146.4 mAh g$^{-1}$ capacity is discharged with 50 wt % loading under the same conditions. The high impedance (FIG. 11) of batteries containing 70 wt % active material corroborates the decrease in discharge capacity compared to that composed of 50 wt % active material. In other words, the (−)-NDI-Δ battery used at least 40 wt % loading of carbon black in order to achieve the best performance. This optimized loading content composition determined for the (−)-NDI-Δ battery-50 wt % active material, 10 wt % PVDF binder and 40 wt % carbon black was applied subsequently during the fabrication of the batteries (i.e., the controls as well).

Independent Verification

Figure 12:
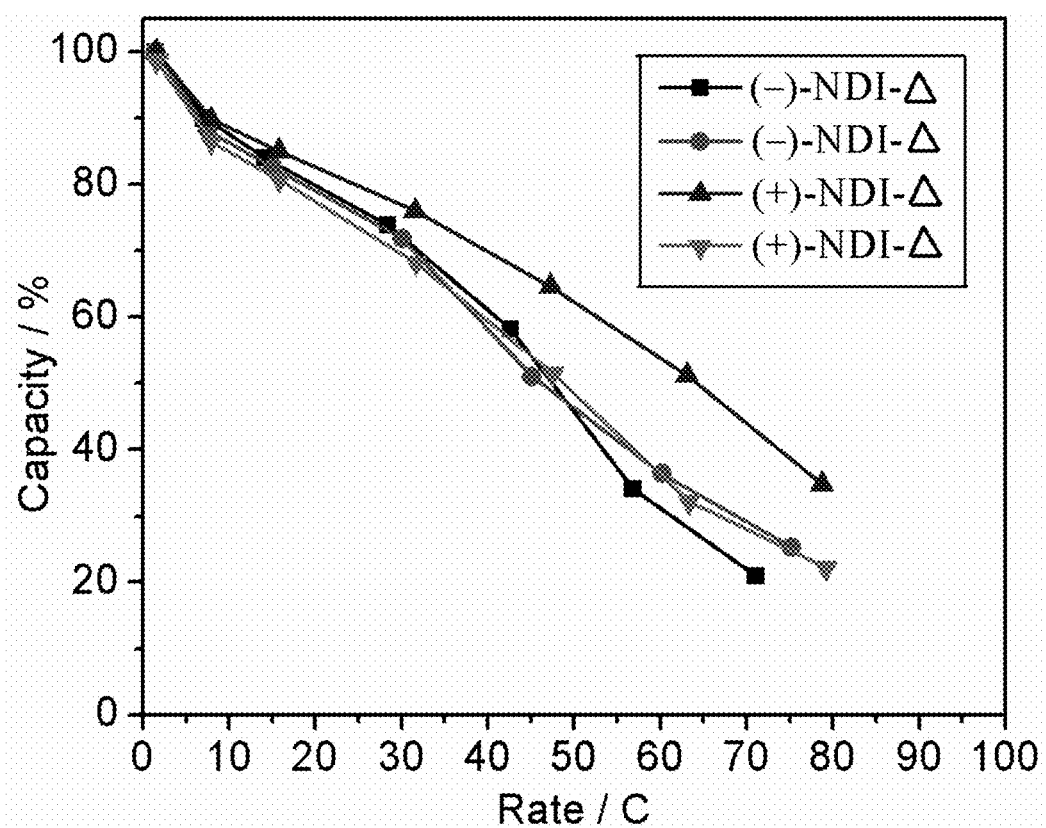
FIG. 12: Normalized discharge capacities of the (−)-NDI-Δ and (+)-NDI-Δ batteries at different current rates. The discharge capacity at 1 C is used for normalization. 1.2 M LiPF6 in a mixed solvent system (7:3 v/v) of ethyl methyl carbonate and ethylene carbonate was used as the electrolyte in this investigation.

Since battery performance usually varies from one laboratory to another, independent testing at Argonne National Laboratory was conducted to verify the reproducibility of the ultrahigh rate performance observed in our laboratory with the (−)-NDI-Δ battery. Batteries were also prepared using the same loading composition (50 wt %) of (+)-NDI-Δ and tested for comparison. Independent tests confirm that the (−)-NDI-Δ and (+)-NDI-Δ batteries exhibit, as expected for enantiomers, nearly identical rate performances (FIG. 12). Significantly, the high rate performances of the (−)-NDI-Δ and (+)-NDI-Δ batteries are still maintained despite the use of a different electrolyte, i.e., 1.2 M LiPF$_6$ in a 7:3 v/v mixed solvent system of ethyl methyl carbonate and ethylene carbonate. Although the capacity values observed in the LiPF$_6$ system were slightly lower than for those obtained using LiTFSI as the electrolyte, these differences are acceptable.

Li$^+$ Diffusion Coefficient

Figure 13:
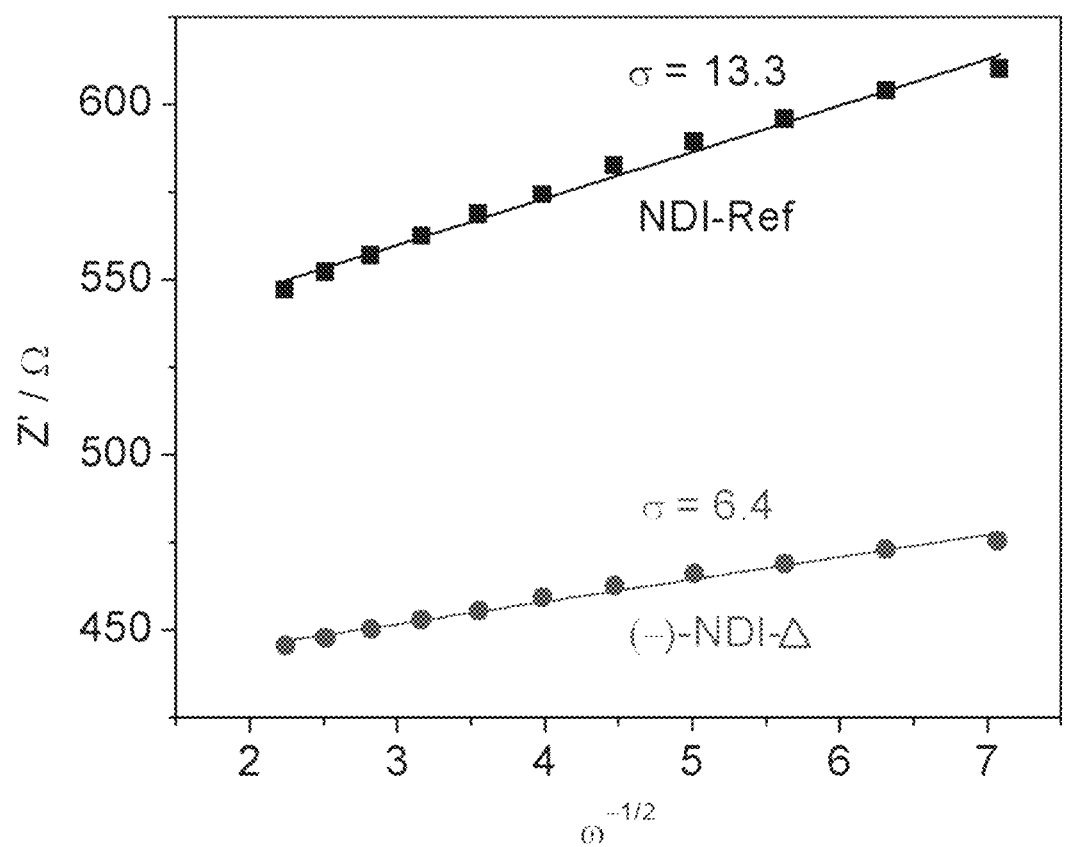
FIG. 13: Plot of real resistance (Z') of the (−)-NDI-Δ and NDI-Ref batteries as a function of the inverse square root of angular frequency (ω). The slopes (σ) of the fitted lines represent the Warburg factor.

Electrochemical impedance spectroscopy (EIS) has been employed to estimate and compare the Li$^+$ ion diffusion coefficients ($D_{Li+}$) for batteries containing (−)-NDI-Δ and NDI-Ref active materials. The cells were cycled firstly between a voltage window of 1.8-3.0V using a current rate of 1 C for one cycle. Then, the cells were discharged to a ~20% state-of-discharge and held for 30 min before the collection of impedance data. Impedance measurements were conducted between 100 KHz and 0.01 Hz in triplicate for each cell. Plotting (FIG. 13) of real resistance (Z') as a function of the inverse square root of angular frequency (ω) displays linear relationships, revealing a slope (σ) of 6.4 for the (−)-NDI-Δ battery and a slope of 13.3 for the NDI-Ref battery. From these values, we calculated $D_{Li+}$ according to the following equation[3]:

$$D_{Li^+} = \frac{0.5\ R^2T^2}{F^4A^2C^2\sigma^2}$$

where R is the ideal gas constant, T is the absolute temperature, F is the Faraday constant, A is the surface area of the electrode, and C is the concentration of Li$^+$ ions in the system. Based on this equation, it was found that the $D_{Li+}$ for the (−)-NDI-Δ battery is ~4 times higher than that for the NDI-Ref battery.

Room Temperature Cycling Performance

Figure 14B:
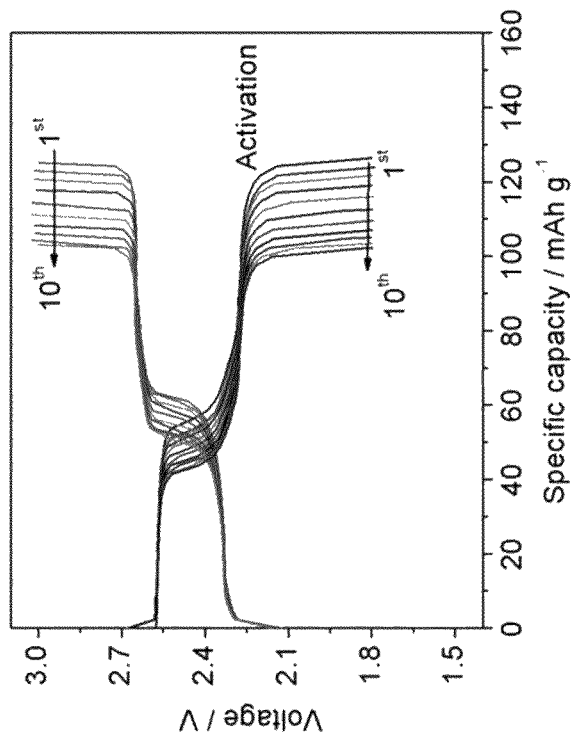
FIG. 14A-D: Charge/discharge curves of the first 10 cycles of the NDI-Ref battery at 1 C (A), (−)-NDI-Δ battery at 1 C (B), and (−)-NDI-Δ battery at 10 C (C), and the Coulombic efficiencies of the batteries during cycling (D).
Figure 14A:
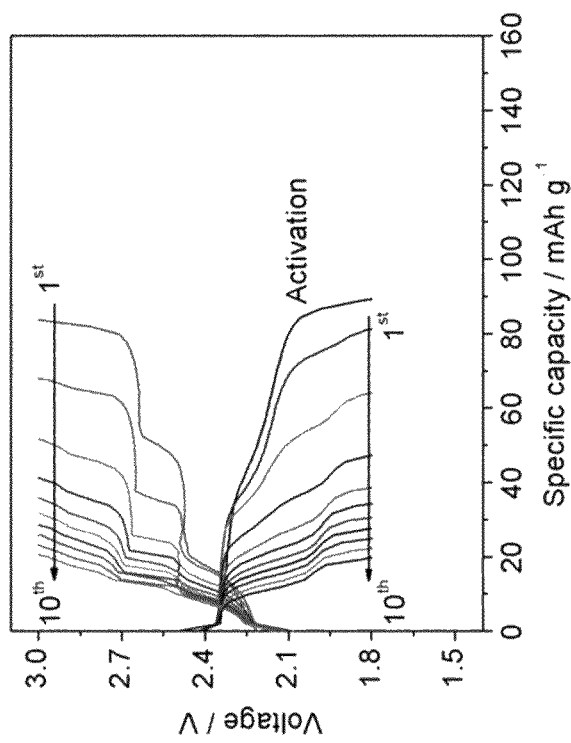
Figure 14C:
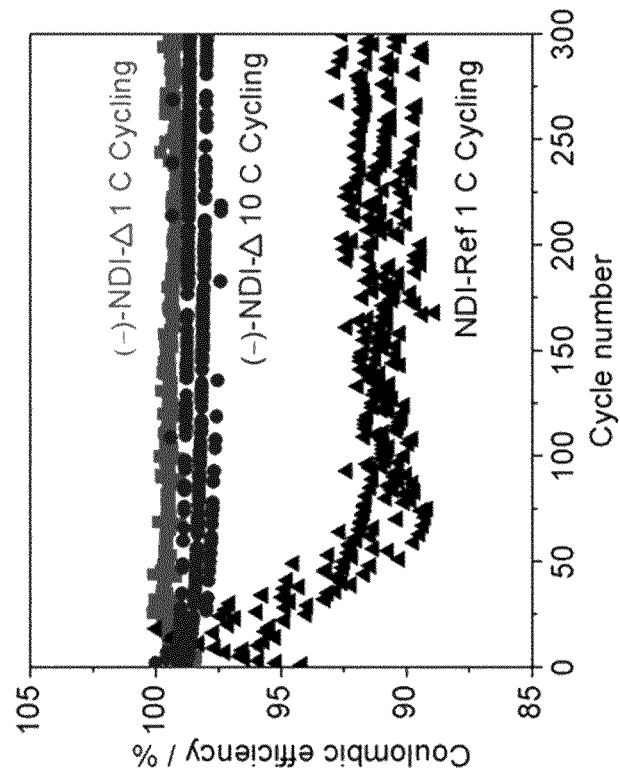
Figure 14D:
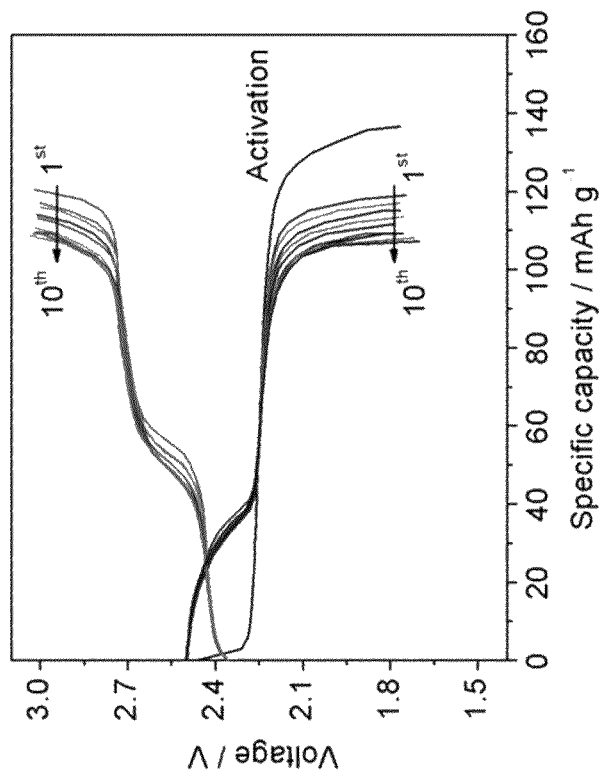

The charge/discharge curves of the first 10 cycles of the NDI-Ref battery at 1 C (FIG. 14A), (−)-NDI-Δ battery at 1 C (FIG. 14B) and (−)-NDI-Δ battery at 10 C (FIG. 14C) all show a constant capacity decay from cycle to cycle. The CEs (FIG. 14D) for the NDI-Ref battery are generally lower than the CEs for the (−)-NDI-Δ battery. After examining the cycled batteries, the presence of some solubized reduced species of the active materials was discovered in the electrolyte. This partial solubility of the active materials in the reduced state, especially under battery operation conditions, is most likely the reason for the moderate CEs of the batteries. The reduced form of (−)-NDI-Δ is still more resistant to solubilization than the reduced form of NDI-Ref.

UV-Vis Measurements

Figure 15:
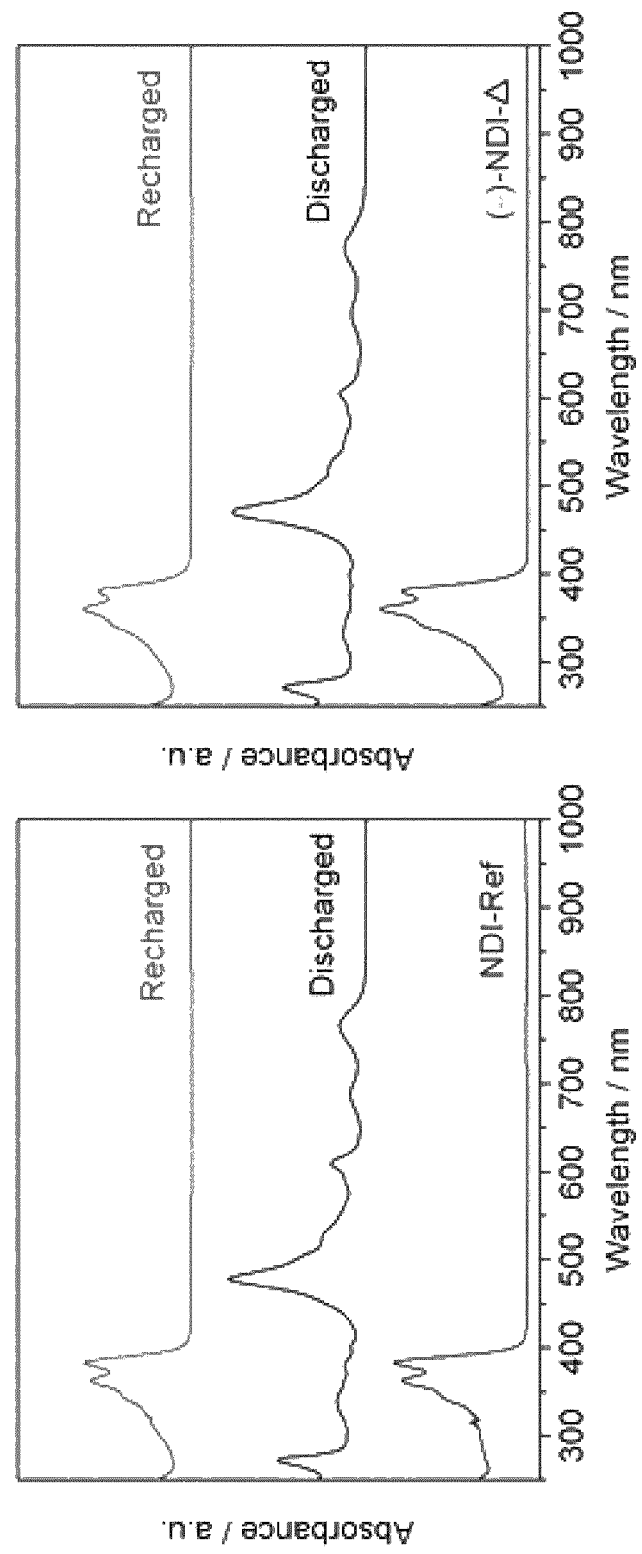
FIG. 15: UV-Vis Spectra of the pristine, discharged, and recharged NDI-Ref (left) and (−)-NDI-Δ (right).
Figure 16:
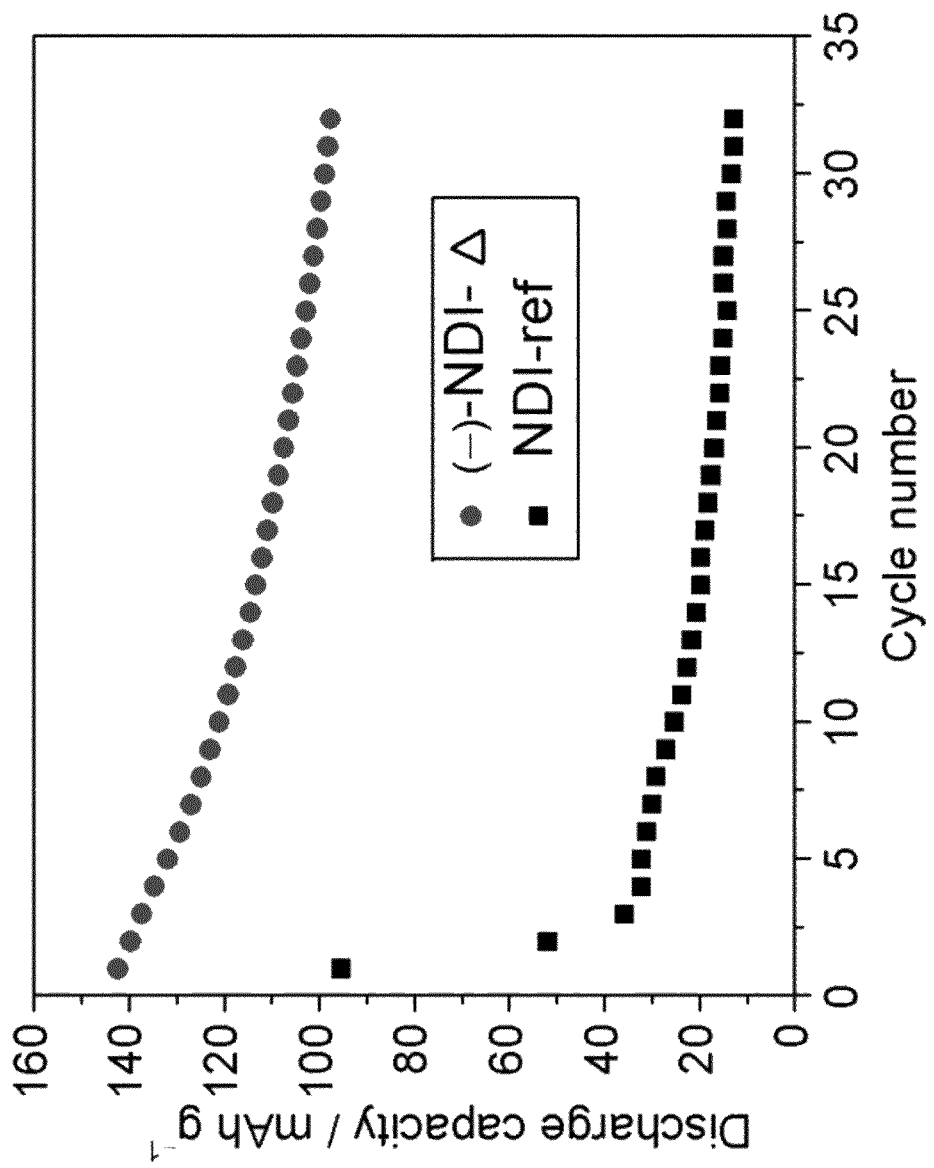
FIG. 16: Discharge capacities of the NDI-Ref and (−)-NDI-Δ batteries cycling at room temperature at a rate of 0.1 C.

The reversibility of the redox reactions were validated by UV-Vis spectroscopy (FIG. 15). Samples were prepared in a glove-box under the protection of Ar. Dimethyl sufoxide was used as solvent to dissolve both the discharged and recharged forms of active materials for UV-vis measurements (SHIMADZU UV-3600). The discharged (reduced) form of the active materials all display new absorption peaks compared to the pristine active materials. After recharging spectra identical to those collected for the pristine active materials, were obtained, suggesting good reversibility of the electrochemical reactions.

Low Rate Cycling Performance at Room Temperature

Figure 6D:
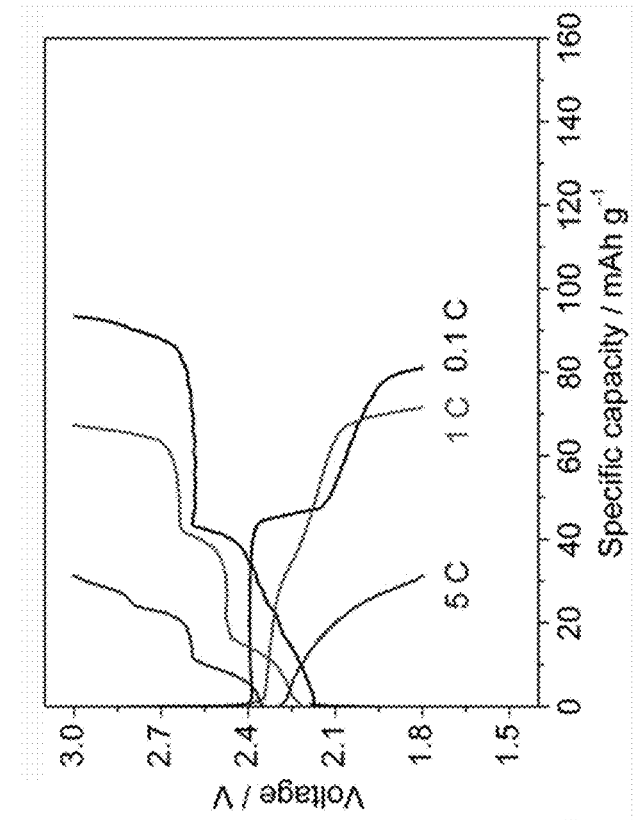
Figure 6C:
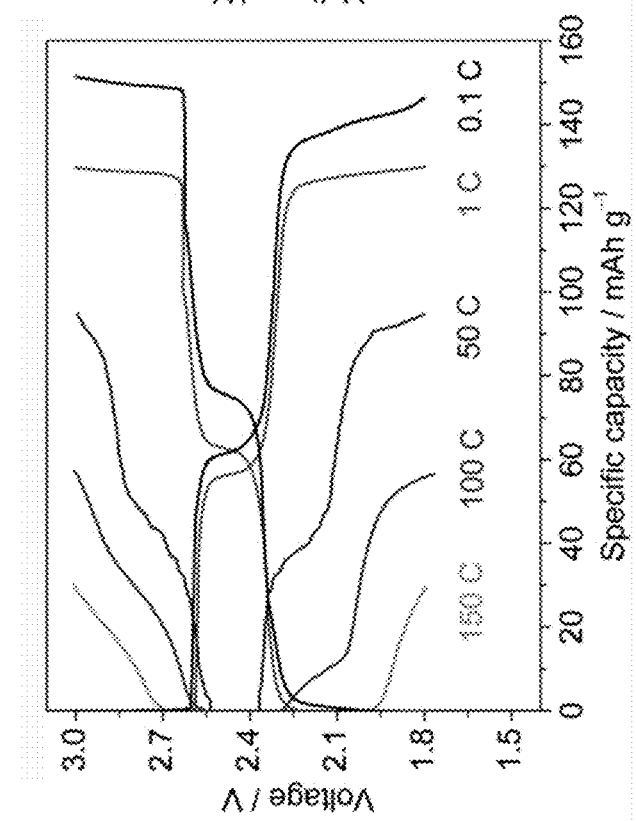

A low current rate of 0.1 C was also used to cycle the batteries at room temperature (FIG. 1y6). In common with the cycling performance at 1 C, the discharge capacity of (−)-NDI-Δ decreases gradually from cycle to cycle. Overall, 15% and 73% of the discharge capacity is lost during the first 10 cycles for the (−)-NDI-Δ and NDI-Ref batteries, respectively.

High Temperature Cycling Performance at 1 C

Figure 17:
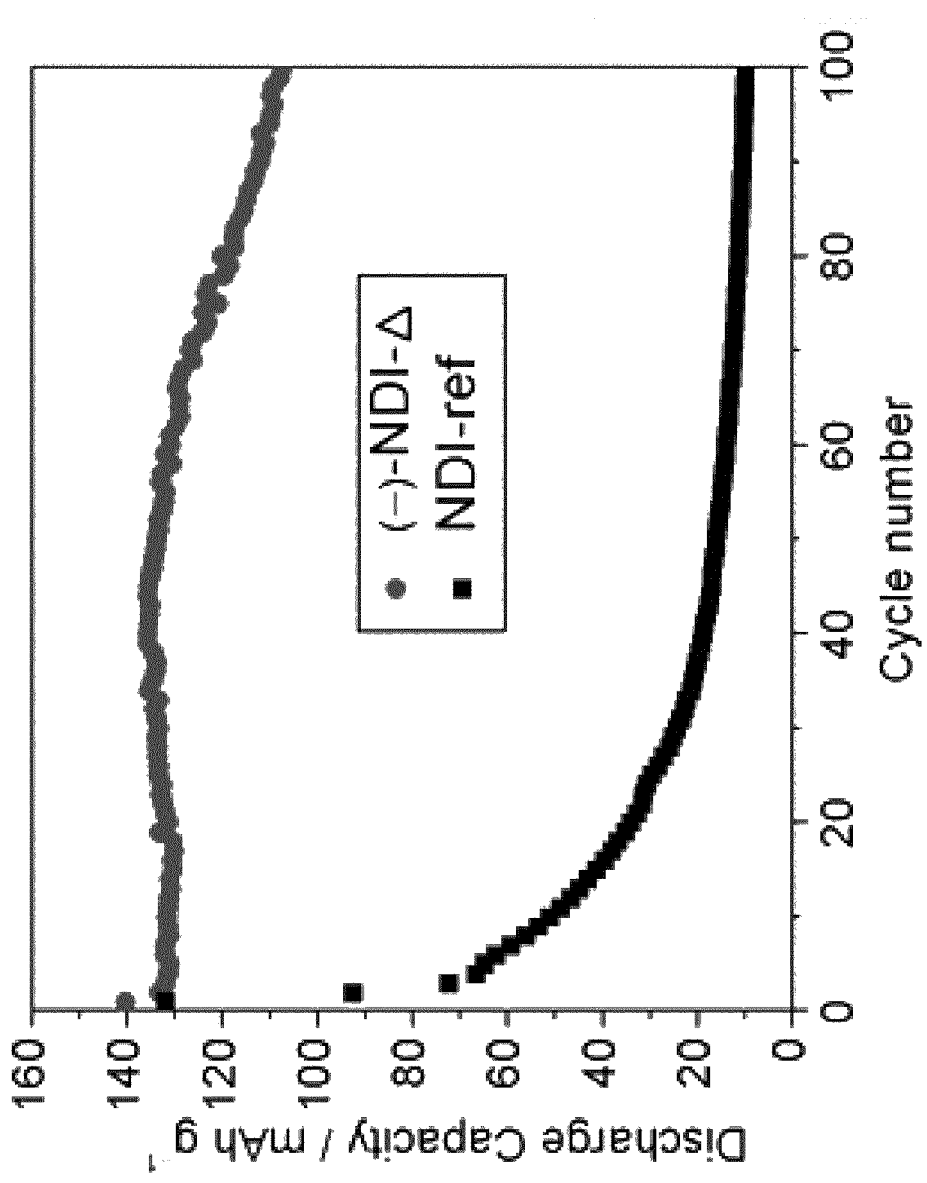
FIG. 17: Discharge capacities of the NDI-Ref and (−)-NDI-Δ batteries cycling at 55° C. at a rate of 1 C.

Batteries were briefly cycled at 55° C. at 1 C. Interestingly, both the (−)-NDI-Δ and NDI-Ref batteries delivered higher capacities (FIG. 17) at this temperature than their capacities obtained at room temperature at a same current rate. Although, the increased ion mobility and lowered activation energy of the electrochemical reactions at elevated temperatures may be the reasons for this better performance, further investigations need to be carried out in order to appreciate the influence of temperature on the cell performance.

Example 2

Results

Figures 5A, 5B:
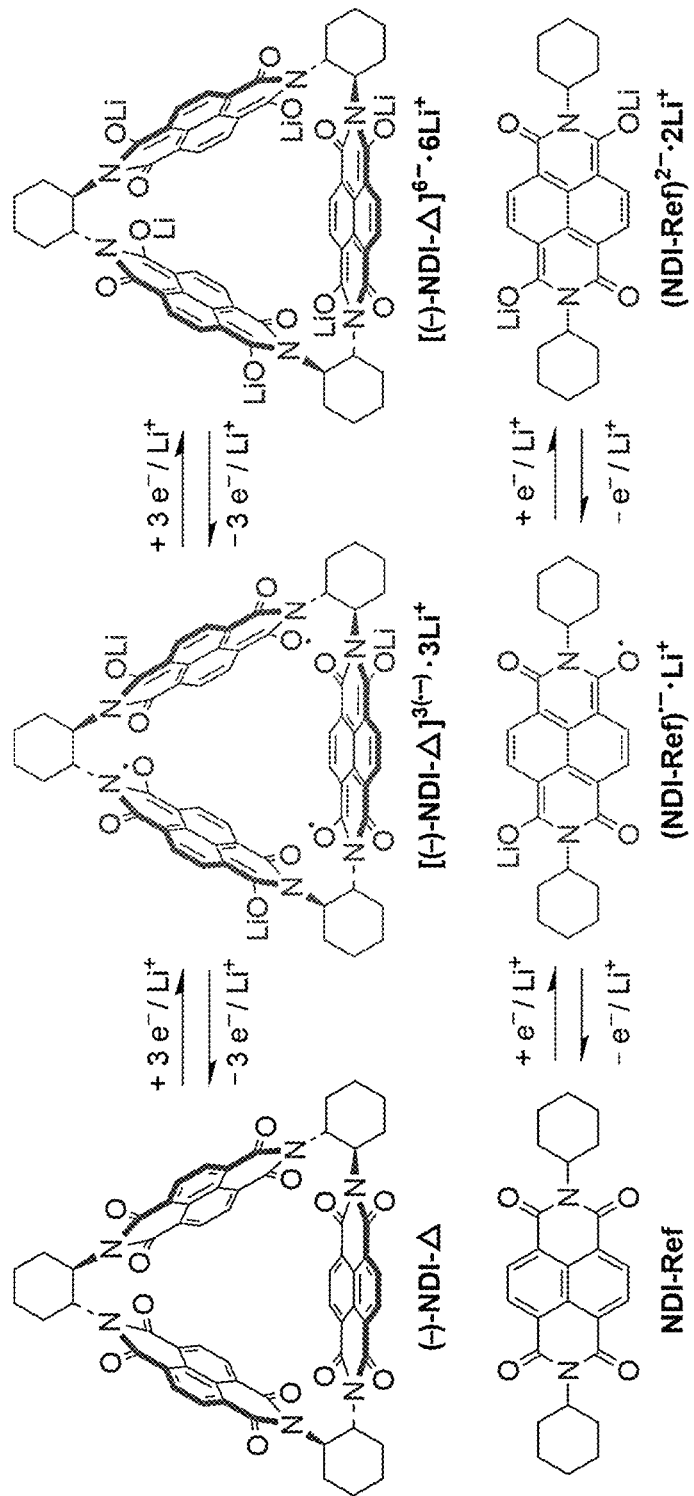
FIGS. 5A and 5B: Structural formulas and redox processes for (−)-NDI-Δ and NDI-Ref. A) Redox reactions between (−)-NDI-Δ, ((−)-NDI-Δ)3(·−)·3Li+ and ((−)-NDI-Δ)6−·6Li+. B) Redox reactions between NDI-Ref, (NDI-Ref)·−·Li+ and (NDI-Ref)2−·2Li+. Each NDI unit is capable of undergoing two reversible one-electron redox processes. Molecular triangles composed of three NDI units undergo two reversible three-electron redox processes, amounting to a total of six electrons per molecule, whereas NDI-Ref only takes on two electrons.

The preparation of the molecular triangular prism (−)-NDI-Δ (FIG. 5A) and its enantiomer (+)-NDI-Δ from a single-step condensation of commercially available naphthalene dianhydride with (RR)- and (SS)-trans-1,2-diaminocyclohexane, respectively, has been reported. (ref 35; incorporated by reference in its entirety). These thermally stable compounds contain three redox-active naphthalenediimide (NDI) units in a rigid, cyclic constitution. Solution-state studies, together with DFT calculations, reveal through-space electron delocalization across the overlapping π-orbitals of the three NDI units as a consequence of their triangular constitution. As a result of this stable electronic coupling, a single molecule of (−)- or (+)-NDI-Δ stores and releases up to six electrons reversibly, yielding a theoretical capacity of 154.8 mAh Furthermore, the (−)- and (+)-NDI-Δ molecular triangles are only sparingly soluble in non-aqueous electrolyte solvents, indicating that they are highly attractive as active materials for use in organic rechargeable lithium-ion batteries. In order to understand the structure—performance relationship of these triangles, a monomeric NDI derivative NDI-Ref (FIG. 5B) was prepared as a control compound.

Experiments were conducted during development of embodiments of the present invention to evaluate the performance of (−)-NDI-Δ versus NDI-Ref as the active component within organic electrodes. Electrode slurries of each were prepared by mixing the desired active material with conductive carbon black and 10 wt % of polyvinylidene fluoride (PVDF) binder in anhydrous N-methyl-2-pyrrolidone (NMP). From screening various organic electrode compositions, it was found that 50 wt % of (−)-NDI-Δ active material was the highest content loading achievable that still maximizes the experimental capacity under conventional battery operation conditions. Consequently, all batteries, including the controls, are composed of 50 wt % active material content (and 40 wt % carbon black). However, higher and lower active-content loads are within the scope herein. On account of the partial solubility of the active materials in NMP, no labor-intensive grinding was needed to disperse them completely with carbon black. The resulting slurries were subjected to ultrasonication for 1 h, followed by coating on an aluminum foil and drying under vacuum at 120° C. for 24 h. Good dispersion of active materials with carbon black was observed (FIG. 10) in both electrodes by scanning electron microscopy (SEM). Half lithium-ion batteries adopting a conventional CR2025 coin cell architecture were assembled subsequently using the (−)-NDI-Δ or NDI-Ref electrode as the cathode and lithium foil as the anode.

Solid-state cyclic voltammograms (CVs) of the (−)-NDI-Δ battery at scan rates of 0.1 and 1 mV·s−1 reveal (FIG. 6A) two sets of peaks, centered at +2.34 and +2.60 V, corresponding to the two three-electron redox steps (Figures) for (−)-NDI-Δ. These assignments are in good agreement with the solution-state CV of (−)-NDI-Δ collected in $CH_2Cl_2$ (1 mM solution), in which two sets of peaks, each consisting of three one-electron redox steps, were observed. (ref. 35) At a scan rate of 1 mV·s$^{-1}$, voltage gaps of less than 200 mV separate the reduction and oxidation peaks associated with each three-electron set, indicating that the electrode reactions in the (−)-NDI-Δ battery use relatively low activation energies. Furthermore, the areas of the oxidation and reduction peaks are nearly equal, affirming that the redox reactions are highly reversible. The good electrochemical stability and reversibility of the (−)-NDI-Δ battery is attributed to the electron sharing properties between the three NDI units arranged in the rigid triangular constitution of (−)-NDI-Δ. The permanent loop of electron-deficient π-orbitals in (−)-NDI-Δ stabilizes the charged reaction intermediates ((−)-NDI-Δ)(3·−)·3Li$^+$ and ((−)-NDI-Δ)(6−)·6Li$^+$, illustrated in FIG. 5A. In contrast, CVs of the NDI-Ref battery at scan rates of 0.1 and 1 mV·s$^{-1}$ do not exhibit (FIG. 6B) mirrored redox curves or good reversibility. The reduction peaks associated with the formation (FIG. 5B) of (NDI-Ref)·−·Li$^+$ and (NDI-Ref)2−·2Li$^+$ are not well-resolved. At a scan rate of 1 mV·s$^{-1}$, a voltage gap of 260 mV is observed between the one-electron oxidation of (NDI-Ref)·−·Li$^+$ and the one-electron reduction of NDI-Ref. This voltage gap, which is much higher than those for the redox reactions of (−)-NDI-Δ under the same conditions, implies that the permanent electronic communication between the NDI units of (−)-NDI-Δ, imposed by its unique rigid macrocyclic constitution, accounts for its enhanced solid-state electrochemical stability in organic electrodes.

Figure 11A:
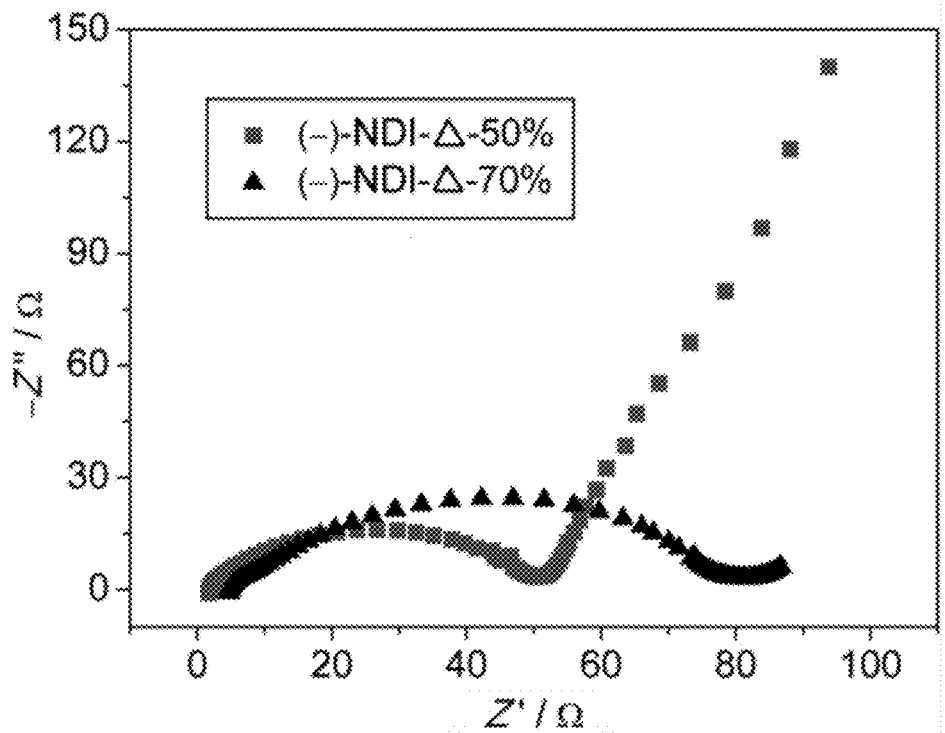
FIGS. 11A and 11B: Cell performance of (−)-NDI-Δ batteries composed of 50 and 70 wt % active material. A) Electrochemical impedance spectra of the (−)-NDI-Δ batteries containing 50 and 70 wt % of active material. B) Charge/discharge curves of the (−)-NDI-Δ batteries containing 50 and 70 wt % of active material at a conventional current rate of 0.1 C.
Figure 11B:
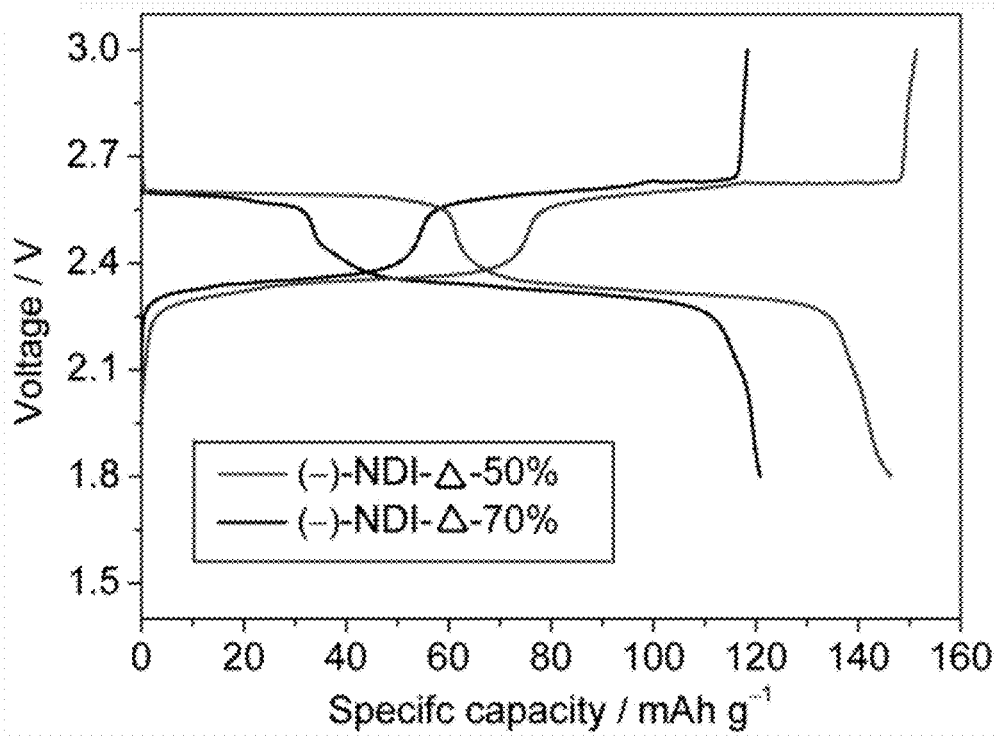

Experiments were conducted during development of embodiments of the present invention to evaluate its charge/discharge properties at different current rates. Theoretically, a current rate of n C refers to achieving full charge or discharge of the battery in 1/n h. A level two-step charge/discharge profile (FIG. 6C) is not only obtained at rates of 0.1 C and 1 C, but is also maintained up to 50 C, before evolving to a one-and-a-half-step profile at 100 C and finally a one-step profile at 150 C. The less resolved charge/discharge profiles observed at rates above 50 C are attributed to increases in electrochemical polarizations in the cell as the rate increases. The ability to charge/discharge at such high rates in a relatively stable manner, while still maintaining significant capacities is rarely observed in organic rechargeable lithium-ion batteries (refs. 36-38; incorporated by reference in their entireties). The two-step charge/discharge profile at low current rates is consistent with the two sets of redox peaks present in the CVs of the (−)-NDI-Δ battery. At a rate of 0.1 C, the charge plateaus for the (−)-NDI-Δ battery are +2.35 and +2.62 V—that is, similar to its discharge plateaus at +2.32 and +2.59 V. These minor deviations between the corresponding charge and discharge plateaus verify that the electrode reactions of (−)-NDI-Δ occur at low activation energies, in line with the CVs. The experimental charge and discharge capacities of the (−)-NDI-Δ battery at 0.1 C are 151.3 and 146.4 mAh g$^{-1}$, corresponding to 98 and 95% of the theoretical capacity for (−)-NDI-Δ, respectively. When loaded with 70 wt. % of (−)-NDI-Δ in the organic electrode, the battery still delivers a moderate capacity of 120.7 mAh g$^{-1}$ at 0.1 C (FIG. 11).

Unlike those for the (−)-NDI-Δ battery, the charge/discharge curves (FIG. 6D) of the NDI-Ref battery, tested at different current rates, do not mirror each other, in line with its CVs. At a rate of 0.1 C, a two-step charge/discharge profile is observed for the NDI-Ref battery, which quickly evolves into a steep one-step profile upon increasing to a rate of 5 C. The experimental charge and discharge capacities of the NDI-Ref battery at 0.1 C are 93.4 and 80.9 mAh corresponding to 75 and 65% of the theoretical capacity (124.4 mAh g$^{-1}$) of NDI-Ref, respectively, and a low Coulombic efficiency of 87%. The energy efficiency for this charge/discharge process, resulting from the ratio of discharged electricity and charged electricity, is 79%—much lower than the 94% energy efficiency of the (−)-NDI-Δ battery at the same current rate. The low Coulombic and energy efficiencies of the NDI-Ref battery is attributed to the higher solubility (~0.1 mg·mL−1) of NDI-Ref in the electrolyte solvents as well as to the high activation energies associated with its redox reactions. Taken as a whole, these data demonstrate that the (−)-NDI-Δ battery operates at much higher current rates with much higher efficiencies than the NDI-Ref battery.

Figure 7A:
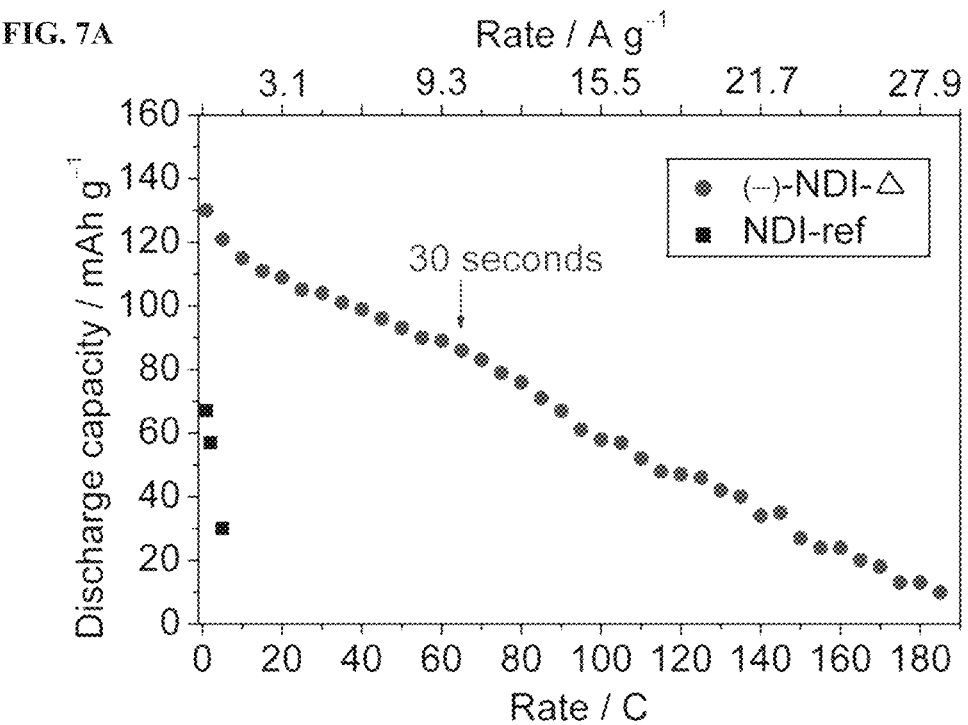
FIGS. 7A and 7B: Discharge capacities and power densities for the (−)-NDI-Δ and NDI-Ref batteries at increasing rates. A) Discharge capacities of the (−)-NDI-Δ and NDI-Ref batteries at different current rates. The experimental discharge times for the (−)-NDI-Δ battery at rates of 65 C and 100 C are 30 and 11 s, respectively. B) Average discharge voltages and power densities of the (−)-NDI-Δ battery at different current rates illustrate its high 'capacitorlike' power density, which reach 51.9 kW kg-1 at 185 C. The inset shows the average discharge voltages and power densities for the NDI-Ref battery.
Figure 7B:
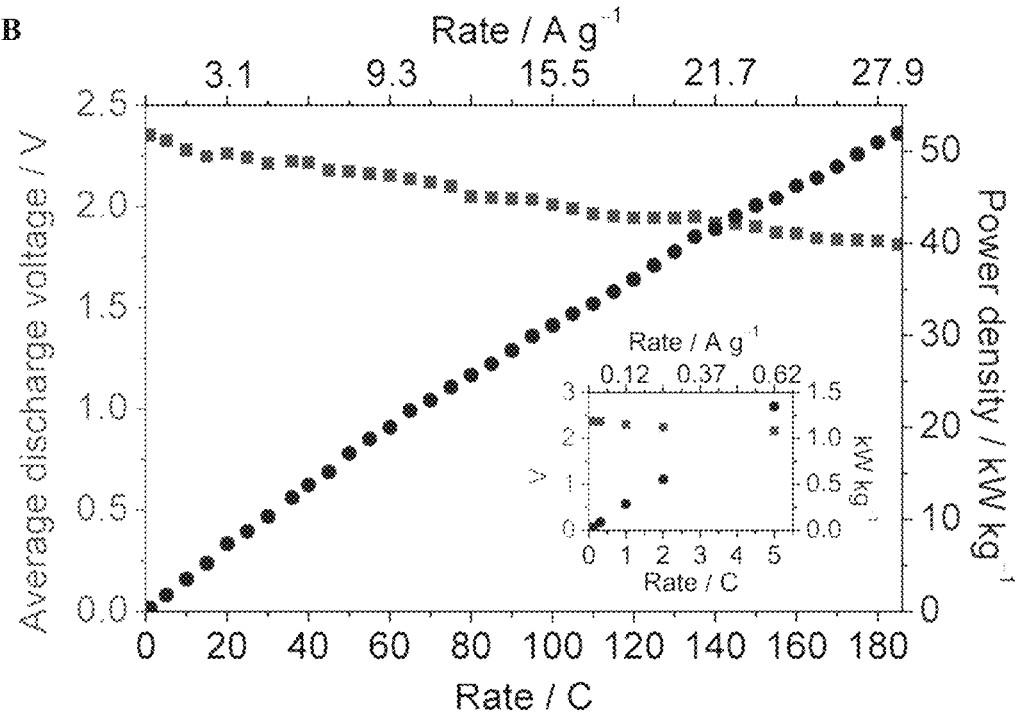

The ultrahigh rate performance (i.e., above 50 C) of the (−)-NDI-Δ battery is illustrated (FIG. 7A) by comparing the experimental discharge capacities at different current rates. Starting from 1 C, the discharge capacity of the (−)-NDI-Δ battery decreases only very gradually as the current rate is increased, and does not appear to bottom out even at an extremely high rate of 185 C. Notably, at a rate of 65 C, a capacity of 86.0 mAh g$^{-1}$ (66% of the discharge capacity normalized to 1 C) is accessed within 30 seconds. At a rate of 100 C, a capacity of 58.1 mAh g$^{-1}$ (45% of the discharge capacity normalized to 1 C) is still accessible—and is attainable in only 11 seconds. This display of ultrahigh rate performance stands in stark contrast to the poor rate performance of the NDI-Ref battery, whose discharge capacity at 5 C is limited to 38% of that at 1 C. The power densities (FIG. 7B) of the (−)-NDI-Δ and NDI-Ref batteries, calculated as the products of the gravimetric current density and average discharge voltage, reveal that the NDI-Ref battery (inset) only achieves a power density of 1.3 kW·kg$^{-1}$—a value that is representative and comparable with the performance of many organic lithium-ion batteries (refs. 39-42; incorporated by reference in their entireties). On the other hand, the (−)-NDI-Δ battery achieves an ultrahigh power density of up to 51.9 kW·kg$^{-1}$. This result was verified independently by third-party testing (FIG. 12), which confirmed that the enantiomer (+)-NDI-Δ also exhibits, as expected, the same high-rate performance as observed for (−)-NDI-Δ. This large enhancement in power density is approximately 40 times greater than what is commonly observed for organic active materials and raises the cell performance of the NDI-Δ batteries well into the regime of electrochemical capacitors. (refs. 43-45)

In the context of traditional inorganic lithium-ion batteries (refs. 46-48; incorporated by reference in their entireties), reducing the particle size of the electrode materials or introducing porosity into the particles has been shown to shorten the diffusion length of Li$^+$ ions, thus improving the efficiency of the electrochemical reactions and rate performance of the batteries. The shape-persistence of three-dimensional inorganic frameworks has also been proven (refs. 34,49,50; incorporated by reference in their entireties) to be important for the consistent and fast intercalation/deintercalation of Li$^+$ ions. In light of these widely accepted rationales for conventional inorganic systems, the (i) the intrinsic nanoporosity, (ii) structural integrity, and (iii) relatively high surface area of (−)-NDI-Δ and (+)-NDI-Δ are the root causes for their remarkable rate performance as organic active materials; although the embodiments herein are not limited to any particular mechanism of action and an understanding of the mechanism of action is not necessary to practice such embodiments. The fact that the three NDI units in both (+)- and (−)-NDI-Δ are held in a shape-persistent triangular geometry provides the compound with a BET surface area of 197 m2·g$^{-1}$, which is two orders of magnitude greater than that (7 m2·g$^{-1}$) of NDI-Ref. A rough estimation of the Li$^+$ ion diffusion coefficient (DLi$^-$) from electrochemical impedance spectra (FIG. 13) reveal that DLi$^+$ for the (−)-NDI-Δ battery is nearly four times greater than that calculated for batteries containing NDI-Ref. Furthermore, the triangular arrangement of the redox-active NDI units in NDI-Δ imparts a unique geometrical feature that favors electron sharing, yielding stable and highly reversible access to a large number of redox states, as evidenced by solution- and solid-state CV. (ref. 35)

Figure 8A:
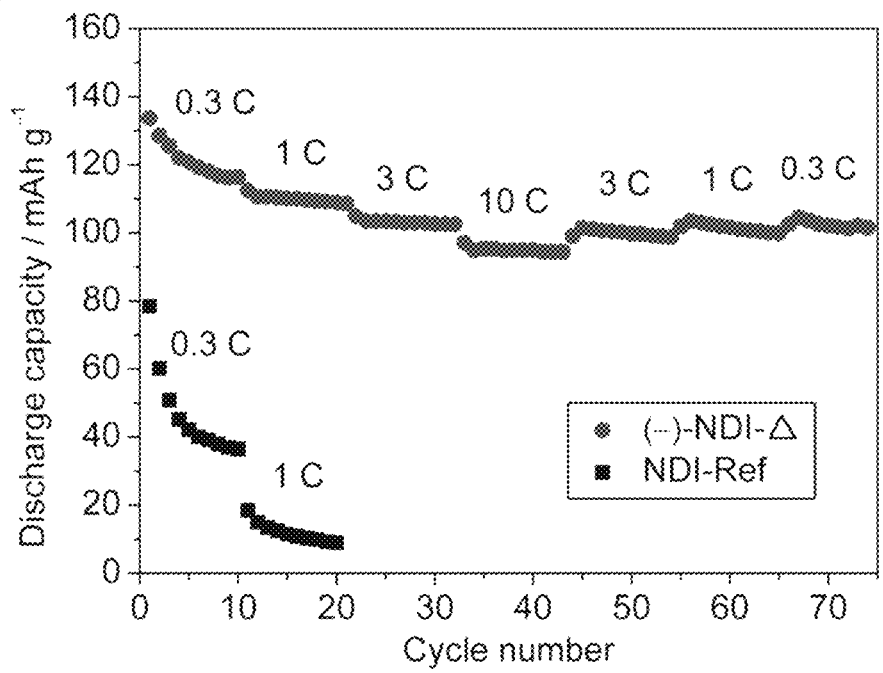
FIGS. 8A and 8B: Cycling performance of the (−)-NDI-Δ and NDI-Ref batteries. A) Short-term cycling performance of the (−)-NDI-Δ and NDI-Ref batteries at different current rates. B) Long-term cycling performance of the (−)-NDI-Δ and NDI-Ref batteries at either a current rate of 1 C or 10 C, showing the goodrechargeability of the (−)-NDI-Δ battery over 300 cycles compared with that of the NDI-Ref battery.
Figure 8B:
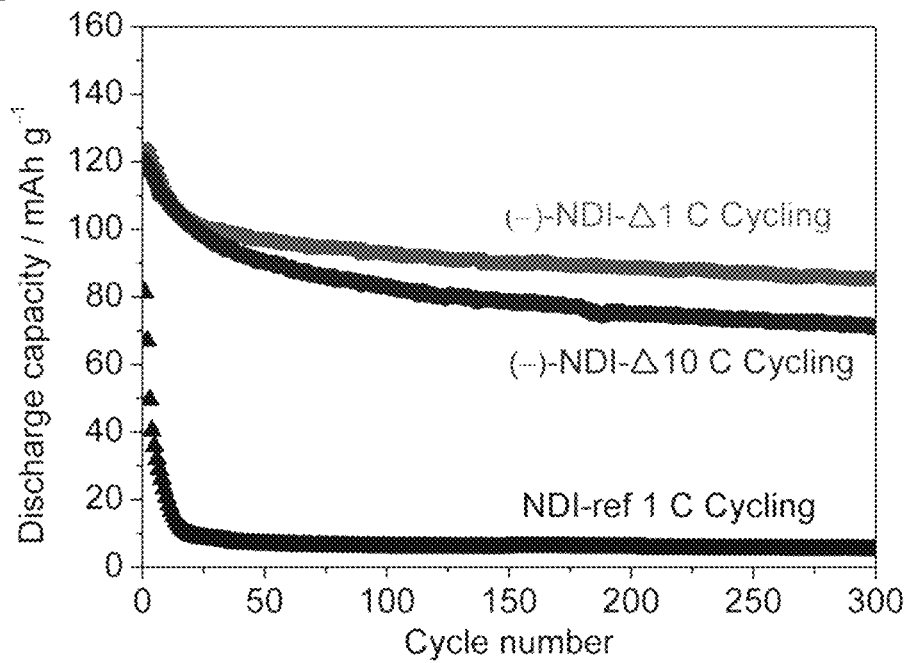

The cycling performance (FIG. 8) of the (−)-NDI-Δ and NDI-Ref batteries was assessed, drawing attention to the differences in their rechargeabilities at low and moderately high rates. A slight capacity decay was observed during the initial cycles (FIG. 14) for all batteries, which is a consequence of the sparing solubility of the neutral, as well as the reduced, states of the active materials under battery operation conditions. After these initial 10 cycles, however, the (−)-NDI-Δ battery displays (FIG. 8A) stable discharge between current rates of 0.3 C and 10 C, while the NDI-Ref battery continues to display rapid decay, losing most of its capacity by the 10th cycle. The fact that NDI-Ref is considerably more soluble than (−)-NDI-Δ in the electrolyte solvents leads to such a drastic loss of active materials from the electrodes during the cycling process (refs. 17,28; incorporated by reference in their entireties). After cycling at a high rate of 10 C for 300 cycles, the (−)-NDI-Δ battery still maintains (FIG. 8B) a capacity of 71.1 mAh g$^{-1}$. Such good rechargeability of the NDI-based molecular triangle, which is further demonstrated by the recovery of the UV-Vis spectrum identical to that of the pristine active materials upon discharging and recharging the batteries (FIG. 15), renders it attractive for organic battery applications where long-term stability and high rate performance—i.e., high power density—are important and technologically desirable.

REFERENCES

The following references, some of which are references above by number, are herein incorporated by reference in their entireties.
(1) Y. Henderson, Science 1915, 41, 910.
(2) C. C. Liang, A. V. Joshi, N. E. Hamilton, J. Appl. Electrochem. 1978, 8, 445.
(3) B. D. Pietro, M. Patriarca, B. Scrosati, J. Power Sources 1982, 8, 289.
(4) G. Cooper, R. Noufi, A. J. Frank, A. J. Nozik, Nature 1982, 295, 578.
(5) X. Ji, K. T. Lee, L. F. Nazar, Nature Mater. 2009, 8, 500.
(6) R. A. Shakoor, H. Kim, W. Cho, S. Y. Lim, H. Song, J. W. Lee, J. K. Kang, Y.-T. Kim, Y. Jung, J. W. Choi, J. Am. Chem. Soc. 2012, 134, 11740.
(7) H.-G. Jung, J. Hassoun, J.-B. Park, Y.-K. Sun, B. Scrosati, Nature Chem. 2012, 4, 579.
(8) H. Liu, F. C. Strobridge, O. J. Borkiewicz, K. M. Wiaderek, K. W. Chapman, P. J. Chupas, C. P. Grey, Science 2014, 344, 1252817.
(9) J. R. Owen, Chem. Soc. Rev. 1997, 26, 259.
(10) M. S. Whittingham, Chem. Rev. 2004, 104, 4271.
(11) K. Amine, R. Kanno, Y. Tzeng, MRS Bull. 2014, 39, 395.
(12) N. S. Choi, Z. Chen, S. A. Freunberger, X. Ji, Y.-K. Sun, K. Amine, G. Yushin, L. F. Nazar, J. Cho, P. G. Bruce, Angew. Chem. Int. Ed. 2012, 51, 9994.
(13) L. F. Nazar, M. Cuisinier, Q. Pang, MRS Bull. 2014, 39, 436.
(14) M. Armand, J. M. Tarascon, Nature 2008, 451, 652.
(15) J. S. Foos, S. M. Erker, L. M. Rembetsy, J. Electrochem. Soc. 1986, 133, 836.
(16) P. Poizot, F. Dolhem, Energy Environ. Sci. 2011, 4, 2003.
(17) J. Gao, M. A. Lowe, S. Conte, S. T. Burkhardt, H. D. Abruña, Chem. Eur. J. 2012, 18, 8521.
(18) A. L. M. Reddy, S. Nagarajan, P. Chumyim, S. R. Gowda, P. Pradhan, S. R. Jadhav, M. Dubey, G. John, P. M. Ajayan, Sci. Rep. 2012, 2, 960.
(19) S. Tobishima, J. Yamaki, A. Yamaji, J. Electrochem. Soc. 1984, 131, 57.
(20) P. Novák, K. Müller, K. S. V. Santhanam, O. Haas, Chem. Rev. 1997, 97, 207.
(21) M. Armand, S. Grugeon, H. Vezin, S. Laruelle, P. Ribière, P. Poizot, J.-M. Tarascon, Nature Mater. 2009, 8, 120.
(22) S. Nishida, Y. Yamamoto, T. Takui, Y. Morita, ChemSusChem 2013, 6, 794.
(23) K. Hernández-Burgos, S. E. Burkhardt, G. G. Rodríguez-Calero, R. G. Henning, H. D. Abruña, J. Phys. Chem. 2014, 118, 6046.
(24) J. Geng, J.-P. Bonnet, S. Renault, F. Dolhem, P. Poizot, Energy Environ. Sci. 2010, 3, 1929.
(25) Y. Hanyu, I. Honma, Sci. Rep. 2012, 2, 453.
(26) S. J. Kim, S. H. Je, S. Sampath, J. W. Choi, A. Coskun, RSC Adv. 2012, 2, 7968.
(27) W. Huang, Z. Zhu, L. Wang, S. Wang, H. Li, Z. Tao, J. Shi, L. Guan, J. Chen, Angew. Chem. Int. Ed. 2013, 52, 9162.
(28) A. Shimizu, H. Kuramoto, Y. Tsujii, T. Nokami, Y. Inatomi, N. Hojo, H. Suzuki, J. Yoshida, J. Power Sources 2014, 260, 211.
(29) K. Nakahara, S. Iwasa, M. Satoh, Y. Morioka, J. Iriyama, M. Suguro, E. Hasegawa, Chem. Phys. Lett. 2002, 359, 351.
(30) P. Nesvadba, L. B. Folger, P. Maire, P. Novák, Synth. Metals 2011, 161, 259.
(31) Y. Inatomi, N. Hojo, T. Yamamoto, S. Watanabe, Y. Misaki, ChemPlusChem 2012, 77, 973.
(32) S. Nishimura, G. Kobayashi, K. Ohoyama, R. Kanno, M. Yashima, A. Yamada, Nature Mater. 2008, 7, 707.
(33) M. Pasta, C. D. Wessells, N. Liu, J. Nelson, M. T. McDowell, R. A. Huggins, M. F. Toney, Y. Cui, Nature Commun. 2014, 5, 3007.
(34) Z. Song, H. Zhao, Energy Environ. Sci. 2013, 6, 2280.
(35) S. T. Schneebeli, M. Frasconi, Z. Liu, Y. Wu, D. M. Gardner, N. L. Strutt, C. Cheng, R. Carmieli, M. R. Wasielewski, J. F. Stoddart, Angew. Chem. Int. Ed. 2013, 52, 13100.
(36) T. Nokami, T. Matsuo, Y. Inatomi, N. Hojo, T. Tsukagoshi, H. Yoshizawa, A. Shimizu, H. Kuramoto, K. Komae, H. Tsuyama, J. Yoshida, J. Am. Chem. Soc. 2012, 134, 19694.
(37) Z. Song, T. Xu, M. L. Gordin, Y.-B. Jiang, I.-T. Bae, Q. Xiao, H. Zhan, J. Liu, D. Wang, Nano Lett. 2012, 12, 2205.
(38) W. Choi, S. Ohtani, K. Oyaizu, H. Nishide, K. E. Geckeler, Adv. Mater. 2011, 23, 4440.
(39) Z. Song, H. Zhan, Y. Zhou, Angew. Chem. Int. Ed. 2010, 49, 8444.
(40) H. Chen, M. Armand, G. Demailly, F. Dolhem, P. Poizot, J.-M. Tarascon, ChemSusChem 2008, 1, 348.
(41) M. Pasquali, G. Pistoia, T. Boschi, P. Tagliatesta, Solid State Ionics 1987, 23, 262.
(42) H. Chen, M. Armand, M. Courty, M. Jiang, C. P. Grey, F. Dolhem, J.-M. Tarascon, P. Poizot, J. Am. Chem. Soc. 2009, 131, 8984.
(43) Y. Kou, Y. Xu, Z. Guo, D. Jiang, Angew. Chem. Int. Ed. 2011, 50, 8753.
(44) K. Sakaushi, G. Nickerl, F. M. Wisser, D. Nishio-Hamane, E. Hosono, H. Zhou, S. Kaskel, J. Eckert, Angew. Chem. Int. Ed. 2012, 51, 7850.
(45) C. R. DeBlase, K. E. Silberstein, T.-T. Truong, H. D. Abruña, W. R. Dichtel, J. Am. Chem. Soc. 2013, 135, 16821.
(46) F. Béguin, E. Frackowiak, Supercapacitors: Materials, Systems and Applications, Wiley-VCH Press, Weinheim, Germany 2013.
(47) Y. Wang, G. Cao, Adv. Mater. 2008, 20, 2251.

(48) Y.-L. Ding, J. Xie, G.-S. Cao, T.-J. Zhu, H.-M. Yu, Adv. Funct. Mater. 2011, 21, 348.
(49) G. Wang, H. Liu, J. Liu, S. Qiao, G. M. Lu, P. Munroe, H. Ahn, Adv. Mater. 2010, 22, 4944.
(50) J. B. Goodenough, K.-S. Park, J. Am. Chem. Soc. 2013, 135, 1167.

The invention claimed is:

1. A cathode material comprising:
   (a) a rigid, macrocyclic, nanoporous, electronically-coupled naphthalenediimide redox-active compound;
   (b) a binder material;
   (c) an electron-conducting additive,
   wherein the cathode material is an intrinsically porous solid-state cathode material; and
   wherein the cathode material has a level two-step charge/discharge profile up to a current rate of 50 C.

2. The cathode material of claim 1, wherein the rigid, macrocyclic, nanoporous, electronically-coupled naphthalenediimide redox-active compound comprises a compound of:

(i)

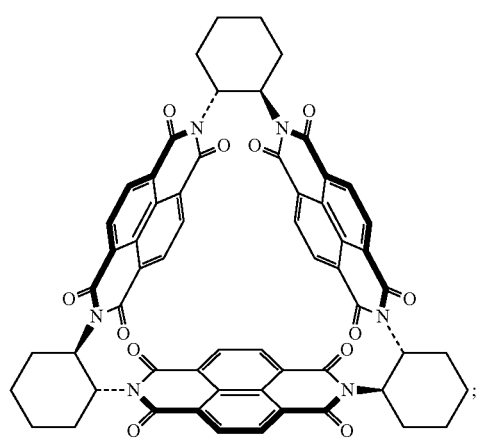

Formula (I)

(ii)

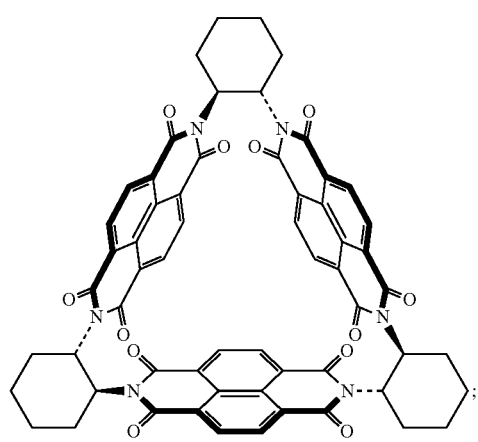

Formula (II)

and/or
   (iii) lithiated derivatives of Formula (I) and/or Formula (II).

3. The cathode material of claim 1, wherein the binder material comprises a polymer selected from the group consisting of: styrene-butadiene rubber (SBR); polyvinylidene fluoride (PVDF); polytetrafluoroethylene (PTFE); copolymer of tetrafluoroethylene, hexafluoropropylene, and vinylidene fluoride; copolymer of hexafluoropropylene and vinylidene fluoride; copolymer of tetrafluoroethylene and perfluorinated vinyl ether.

4. The cathode material of claim 1, further comprising a solvent.

5. The cathode material of claim 1, wherein the electron-conducting additive is a carbon or graphitic material selected from the list consisting of: a graphite, a carbon black, a graphene, a carbon nanotube, a chemically-etched or expanded soft carbon, a chemically-etched or expanded hard carbon, and an exfoliated activated carbon.

6. The cathode material of claim 1, wherein the cathode material is present as a slurry.

7. A cathode comprising a cathode material of claim 1.

8. The cathode of claim 7, further comprising a foil substrate.

9. The cathode of claim 8, wherein the foil substrate is an aluminum foil substrate.

10. A battery comprising a cathode of claim 7.

11. The battery of claim 10, further comprising an anode comprising:
    (a) a graphite or other carbon-based active material;
    (b) a binder material;
    (c) an electron-conducting additive; and
    (d) a copper or nickel foil substrate.

12. The battery of claim 10, further comprising a separator.

13. The battery of claim 12, wherein the separator comprises polypropylene (PP), polyethylene (PE), or a combination of layers thereof.

14. The battery of claim 10, further comprising an electrolyte material.

15. The battery of claim 14, wherein the electrolyte material comprises NiCd, NiMH, Li-ion, Li-ion polymer, lead acid, and/or alkaline.

16. The battery of claim 15, wherein the electrolyte material comprises non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and/or lithium triflate ($LiCF_3SO_3$).

17. The battery of claim 10, wherein the battery is rechargeable.

18. The cathode material of claim 1, wherein the rigid, macrocyclic, nanoporous, electronically-coupled naphthalenediimide redox-active compound is 40-70 wt % of the cathode material.

19. A battery comprising:
    (a) a cathode, the cathode comprising an intrinsically porous solid-state cathode material and a substrate, wherein the intrinsically porous solid-state cathode material comprises
       (i) a rigid, macrocyclic, nanoporous, electronically-coupled naphthalenediimide redox-active compound;
       (ii) a binder material; and
       (iii) an electron-conducting additive,
       wherein the rigid, macrocyclic, nanoporous, electronically-coupled naphthalenediimide redox-active compound is 40-70 wt % of the intrinsically porous solid-state cathode material;
    (b) an anode; and
    (c) an electrolyte, wherein the battery is rechargeable and maintains discharge capacity after 300 cycles at a current rate greater than or equal to 1 C.

\* \* \* \* \*